US012652512B2

(12) United States Patent
Zhang

(10) Patent No.: US 12,652,512 B2
(45) Date of Patent: Jun. 9, 2026

(54) INFORMATION PROCESSING METHOD, DEVICE, SERVER AND V2X UE

(71) Applicant: DATANG MOBILE COMMUNICATIONS EQUIPMENT CO., LTD., Beijing (CN)

(72) Inventor: Ling Zhang, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 497 days.

(21) Appl. No.: 18/042,668

(22) PCT Filed: Aug. 23, 2021

(86) PCT No.: PCT/CN2021/114072
§ 371 (c)(1),
(2) Date: Feb. 23, 2023

(87) PCT Pub. No.: WO2022/024283
PCT Pub. Date: Mar. 3, 2022

(65) Prior Publication Data
US 2023/0379675 A1 Nov. 23, 2023

(30) Foreign Application Priority Data
Aug. 24, 2020 (CN) .......................... 202010856415.4

(51) Int. Cl.
*H04W 4/44* (2018.01)
*H04W 8/20* (2009.01)
(Continued)

(52) U.S. Cl.
CPC .............. *H04W 4/44* (2018.02); *H04W 8/20* (2013.01); *H04W 28/0215* (2013.01); *H04W 88/06* (2013.01); *H04W 92/18* (2013.01)

(58) Field of Classification Search
CPC ..... H04W 4/44; H04W 8/20; H04W 28/0215; H04W 88/06; H04W 92/18; H04W 24/02;
(Continued)

(56) References Cited

U.S. PATENT DOCUMENTS

2020/0163005 A1 5/2020 Rao et al.
2020/0267517 A1 8/2020 El Essaili et al.
(Continued)

FOREIGN PATENT DOCUMENTS

| CN | 111432457 A | 7/2020 |
| EP | 3893558 A1 | 10/2021 |
| WO | 2020/143564 A1 | 7/2020 |

OTHER PUBLICATIONS

3GPP TSG-SA WG6 Meeting #25; S6-181168 (revision of S6-181106); Proposal for solution to key issue on switching modes of operation; Sophia Antipolis; France, Jul. 23-27, 2018 (Year: 2018).*
(Continued)

*Primary Examiner* — Hirdepal Singh
(74) *Attorney, Agent, or Firm* — Harness, Dickey & Pierce, P.L.C.

(57) ABSTRACT

An information processing method, device, server, and V2X UE are provided, the information processing method includes: receiving first pre-configured information sent by a second server; obtaining communication mode decision information according to the first pre-configured information; sending the communication mode decision information to corresponding V2X UEs; wherein, the first pre-configured information includes at least one of the following information: service configuration information for at least two V2X UEs; communication mode decision information for the at least two V2X UEs; there being a correlation between the communication mode decision information and an V2X service.

18 Claims, 15 Drawing Sheets

(51) Int. Cl.

| | |
|---|---|
| *H04W 28/02* | (2009.01) |
| *H04W 88/06* | (2009.01) |
| *H04W 92/18* | (2009.01) |

(58) Field of Classification Search
CPC ......... H04W 4/40; H04W 4/46; H04W 40/22; H04W 28/0289; H04L 43/08; H04L 43/0817; H04L 67/12
USPC ........................................................ 455/419
See application file for complete search history.

(56) References Cited

U.S. PATENT DOCUMENTS

| | | | |
|---|---|---|---|
| 2021/0345237 A1 | 11/2021 | Ge et al. | |
| 2022/0264533 A1* | 8/2022 | Zhang ................... | H04L 1/1812 |
| 2023/0188964 A1* | 6/2023 | Pateromichelakis ... | H04L 67/34 |
| | | | 709/218 |
| 2023/0206760 A1* | 6/2023 | Amogh ................ | G08G 1/0112 |
| | | | 701/24 |
| 2024/0203171 A1* | 6/2024 | El Essaili ............... | H04W 4/44 |

OTHER PUBLICATIONS

International Search Report and Written Opinion issued Nov. 11, 2021 in International Application No. PCT/CN2021/114072.
CATT. "V2V Communication Mode Switching" 3GPP TSG-SA WG6 Meeting #40-e S6-202143, Nov. 11, 2020.
Hua Wei et al. "Operation Modes Selection for V2V Communications" 3GPP TSG-SA WG6 Meeting #28 S6-190141, Jan. 14, 2019.
Hua Wei et al. "Proposal for Solution to Key Issue on Switching Modes of Operation" 3GPP TSG-SA WG6 Meeting #25 S6-181237, Jul. 30, 2018.
Extended European Search Report issued Jan. 19, 2024 in European Application No. 21860318.1.
"3GPP, ""3rd Generation Partnership Project; Technical Specification Group Services and System Aspects; Study on application layer support for V2X services; (Release 16)""", 3GPP TR 23.795, Dec. 21, 2018".
First Office Action issued Jul. 19, 2024 in Chinese Application No. 202010856415.4.
Huawei, "Proposal for solution to key issue on switching modes of operation," 3GPP TSG-SA WG6 Meeting #25, S6-181168, Jul. 23, 2018.

* cited by examiner

Figures 3, 4:
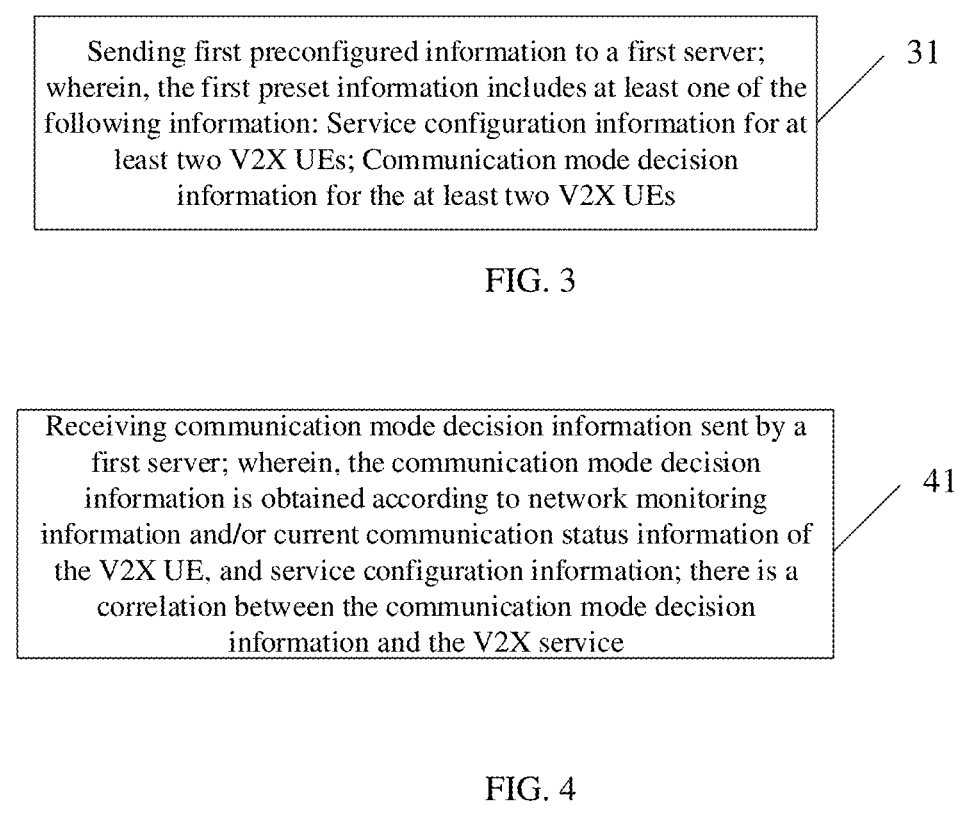

Sending first preconfigured information to a first server;
wherein, the first preset information includes at least one of the
following information: Service configuration information for at
least two V2X UEs; Communication mode decision
information for the at least two V2X UEs

Receiving communication mode decision information sent by a
first server; wherein, the communication mode decision
information is obtained according to network monitoring
information and/or current communication status information of
the V2X UE, and service configuration information; there is a
correlation between the communication mode decision
information and the V2X service

INFORMATION PROCESSING METHOD, DEVICE, SERVER AND V2X UE

CROSS-REFERENCE TO RELATED APPLICATIONS

The present disclosure is the U.S. national phase of PCT Application No. PCT/CN2021/114072 filed on Aug. 23, 2021 which claims priorities of the Chinese patent application No. 202010856415.4 filed on Aug. 24, 2020, which are incorporated herein by reference in their entireties.

TECHNICAL FIELD

The present disclosure relates to the field of communications technology, in particular to a signal processing method and device, a server and a Vehicle to Everything (V2X) user equipment (UE).

BACKGROUND

Vehicle wireless communication technology (Vehicle to Everything, V2X) is a new generation of information communication technology that connects vehicles to everything. V stands for vehicles, and X stands for any object that interacts with vehicles. Currently, X mainly includes vehicles, people, traffic roadside infrastructure and networks. The V2X interaction information modes include: Vehicle to Vehicle (V2V), Vehicle to Infrastructure (V2I), Vehicle to Pedestrian (V2P), Vehicle to Network (V2N) interaction.

V2V refers to the communication between vehicles through the vehicle-mounted UE. Vehicle-mounted UEs can obtain information such as the speed, location, and driving conditions of surrounding vehicles in real time, and an interactive platform can also be formed between vehicles to exchange information such as text, pictures, and videos in real time. V2V communication is mainly used to avoid or reduce traffic accidents, vehicle supervision and management, etc.

The selection and decision of the V2V communication mode depends on the V2X UE itself, and the network side does not participate in the influence and decision. The V2X UE decides whether and how to select the V2V communication mode. However, this approach has the following disadvantages:

The decision of the V2V communication mode is determined by each individual V2X UE. It may cause attenuation or loss of the transmission signal due to the selection of a mode that does not match the current wireless transmission environment, which may cause communication mode conversion failure, may cause local performance degradation of the network, or may cause a V2V communication signaling storm caused by the excessive vehicle density, and thus cause the application server to crash, etc.

It can be seen that the switching between communication modes of V2V communication is determined by the UE alone, which may reduce the performance and stability of the overall service quality of V2X, and cause local service and network congestion.

SUMMARY

Embodiments of the present disclosure provide an information processing method and device, a server and V2X UE, so as to the problem in the relate art that information processing method of switching V2V communication modes may reduce the performance and stability of the overall service quality of V2X, and cause local service and network congestion.

In order to solve the above problem, an embodiment of the present disclosure provides an information processing method, is applied to a first server and includes: receiving first pre-configured information sent by a second server; obtaining communication mode decision information according to the first pre-configured information; sending the communication mode decision information to corresponding V2X UEs; wherein, the first pre-configured information includes at least one of the following information: service configuration information for at least two V2X UEs; communication mode decision information for the at least two V2X UEs; there being a correlation between the communication mode decision information and an V2X service.

Optionally, in the case that the first pre-configured information includes service configuration information, the obtaining communication mode decision information according to the first pre-configured information includes: obtaining network monitoring information for the at least two V2X UEs and/or current communication status information of each V2X UE; and obtaining the communication mode decision information according to the network monitoring information and/or communication status information, and service configuration information.

Optionally, the obtaining the communication mode decision information according to the network monitoring information and/or communication status information, and service configuration information includes: obtaining real-time information of pre-configured parameters according to the network monitoring information for at least two V2X UEs and/or the current communication status information of each V2X UE; obtaining the communication mode decision information according to the real-time information and the service configuration information; wherein the pre-configured parameters include at least one of the following: a density of V2X UEs within a geographical area where the V2X UEs are located; a transmission environment scenario where the V2X UEs are located; a service experience quality of the V2X UEs; a location area where the V2X UEs are located.

Optionally, the receiving first pre-configured information sent by a second server includes: sending first request information to the second server; receiving first response information fed back by the second server according to the first request information, the first response information carrying first pre-configured information; or, sending first subscription information to the second server; receiving first notification information fed back by the second server according to the first subscription information, the first notification information carrying the first pre-configured information.

Optionally, when the first pre-configured information includes communication mode decision information, before receiving the first pre-configured information sent by the second server, the method further includes: obtaining network monitoring information for the at least two V2X UEs and/or current communication status information of each V2X UE; sending the network monitoring information and/or the communication status information to the second server; or processing the network monitoring information to obtain communication mode decision reference information; sending the communication mode decision reference information and/or the communication status information to the second server.

Optionally, the communication status information includes at least one of the following: vehicle-to-vehicle communication mode information; identity information of a peer UE of vehicle-to-vehicle communication; service quality information; an identifier of the V2X UE; speed information of the V2X UE; service identification information.

Optionally, the vehicle-to-vehicle communication mode information includes: long term evolution (LTE) Uu communication of an interface between an LTE base station and a UE, ProSe direct communication interface 5 (PC5) communication mode, new radio (NR) Uu communication of an interface between an NR interface base station and a UE and a PC5 communication mode, an LTE Uu communication mode or an NR Uu communication mode; and/or, the identity information of the peer UE of the vehicle-to-vehicle communication includes: client identification information corresponding to a peer V2X UE, the identification information of the peer V2X UE and/or identification information of a peer V2X user; and/or, the quality of service information includes: end-to-end service delay information and/or data packet loss rate information of the V2X UE; and/or, the identifier of the V2X UE includes: client identification information corresponding to the V2X UE, identification information of the V2X UE, and/or identification information of an V2X user.

Optionally, the obtaining the current communication status information of each V2X UE includes: sending second request information to the V2X UE; receiving second response information fed back by the V2X UE according to the second request information; wherein the second response information carries the communication status information; or, sending second subscription information to the V2X UE; receiving second notification information fed back by the V2X UE according to the second subscription information; wherein the second notification information carries the communication status information.

Optionally, the obtaining the network monitoring information for the at least two V2X UEs includes: interacting with a core network to obtain the network monitoring information.

Optionally, after obtaining the network monitoring information for the at least two V2X UEs and/or the current communication status information of each V2X UE, the method further includes: sending third request information to the second server; wherein the third request information carries second pre-configured information and the communication status information; the receiving the first pre-configured information sent by the second server includes: receiving third response information fed back by the second server according to the third request information, wherein the third response information carries the first pre-configured information; or, sending third subscription information to the second server; wherein the third subscription information carries the second pre-configured information and the communication status information; the receiving the first pre-configured information sent by the second server includes: receiving third notification information fed back by the second server according to the third subscription information, wherein the third notification information carries the first pre-configured information; wherein the second pre-configured information includes any one of the following: network monitoring information for the at least two V2X UEs; communication mode decision reference information.

Optionally, the sending the communication mode decision information to corresponding V2X UEs includes: sending fourth request information to the V2X UE, wherein the fourth request information carries the communication mode decision information; or, sending network monitoring information notification to the V2X UE, wherein the network monitoring information notification carries the communication mode decision information.

Optionally, after sending the fourth request information to the V2X UE, the method further includes: receiving fourth response information fed back by the V2X UE according to the fourth request information.

Optionally, after receiving fourth response information fed back by the V2X UE according to the fourth request information, the method further includes: sending the fourth response information to the second server.

Optionally, the fourth response information carries communication mode execution decision information and/or service identifier association update information; or, the fourth response information carries communication mode execution result information and/or the service identifier association update information.

Optionally, the communication mode execution decision information includes at least one of the following: executing to establish a target communication mode; executing to cancel the target communication mode; executing to determine and establish the target communication mode according to communication mode reference information.

Optionally, the communication mode decision information carries any one of the following: target communication mode establishment indication information; target communication mode cancellation indication information; communication mode information; communication mode reference information.

Optionally, the target communication mode includes any one of the following: only the ProSe direct communication interface (PC5) communication mode; PC5 communication mode and the LTE Uu communication mode of the interface between the LTE base station and the UE; PC5 communication mode and the NR Uu communication mode of the interface between the NR base station and the UE; only LTE Uu communication mode; only NR Uu communication mode.

Optionally, the communication mode reference information includes a correlation between the communication mode and at least one of the following: network monitoring information for the V2X UE; communication status information of the V2X UE; service configuration information.

Optionally, the network monitoring information includes: congestion level information, overload level information, location area information and/or effective time zone information; and/or, the service configuration information includes service configuration identification information, or service configuration index information.

Optionally, the service configuration information includes: communication mode information, third pre-configured information, and service configuration identification information or service configuration index information; wherein, the third pre-configured information includes at least one of the following: transmission environment scenario information; location area information; density information; speed information; congestion level information; overload level information; service identification information.

An embodiment of the present disclosure provides an information processing method, is applied to a second server, and includes: sending first pre-configured information to a first server; wherein, the first pre-configured information includes at least one of the following: service configuration information for at least two V2X UEs; communication mode decision information for the at least two V2X UEs.

Optionally, when the first pre-configured information includes communication mode decision information, before sending the first pre-configured information to the first server, the method further includes: receiving second pre-configured information sent by the first server and current communication status information of each V2X UE; obtaining communication mode decision information according to the second pre-configured information and/or communication status information, and service configuration information; wherein, the second pre-configured information includes any one of the following: network monitoring information for the at least two V2X UEs; communication mode decision reference information.

Optionally, the obtaining communication mode decision information according to the second pre-configured information and/or communication status information and service configuration information includes: obtaining real-time information of pre-configured parameters according to the second pre-configured information and/or the communication status information; obtaining communication mode decision information according to the real-time information and the service configuration information; wherein the pre-configured parameters include at least one of the following: a density of V2X UEs within a geographical area where the V2X UEs are located; a transmission environment scenario where the V2X UEs are located; a service experience quality of the V2X UEs; a location area where the V2X UEs are located.

Optionally, the communication status information includes at least one of the following: vehicle-to-vehicle communication mode information; identity information of a peer UE of vehicle-to-vehicle communication; service quality information; an identifier of the V2X UE; speed information of the V2X UE; service identification information.

Optionally, the vehicle-to-vehicle communication mode information includes: long term evolution (LTE) Uu communication of an interface between an LTE base station and a UE, ProSe direct communication interface 5 (PC5) communication mode, new radio (NR) Uu communication of an interface between an NR interface base station and a UE and a PC5 communication mode, an LTE Uu communication mode or an NR Uu communication mode; and/or, the identity information of the peer UE of the vehicle-to-vehicle communication includes: client identification information corresponding to a peer V2X UE, the identification information of the peer V2X UE and/or identification information of a peer V2X user; and/or, the quality of service information includes: end-to-end service delay information and/or data packet loss rate information of the V2X UE; and/or, the identifier of the V2X UE includes: client identification information corresponding to the V2X UE, identification information of the V2X UE, and/or identification information of an V2X user.

Optionally, the receiving the second pre-configured information sent by the first server and the current communication status information of each V2X UE includes: receiving third request information sent by the first server; wherein the third request information carries the second pre-configured information and the communication status information; the sending the first pre-configured information to the first server includes: feeding back third response information to the first server according to the third request information, wherein the third response information carries the first pre-configured information; or receiving third subscription information sent by the first server; wherein the third subscription information carries the second pre-configured information and the communication status information; the sending the first pre-configured information to the first server includes: feeding back third notification information to the first server according to the third subscription information, wherein the third notification information carries the first pre-configured information.

Optionally, when the first pre-configured information includes service configuration information, the sending the first pre-configured information to the first server includes: receiving first request information sent by the first server; feeding back first response information to the first server according to the first request information, wherein the first response information carries the first pre-configured information; or receiving first subscription information sent by the first server; feeding back first notification information to the first server according to the first subscription information, wherein the first notification information carries the first pre-configured information.

Optionally, after sending the first pre-configured information to the first server, the method further includes: receiving fourth response information sent by the first server.

Optionally, the fourth response information carries communication mode execution decision information and/or service identifier association update information; or, the fourth response information carries communication mode execution result information and/or the service identifier association update information.

Optionally, the communication mode decision information carries any one of the following: target communication mode establishment indication information; target communication mode cancellation indication information; communication mode information; communication mode reference information.

Optionally, the target communication mode includes any one of the following: only the ProSe direct communication interface (PC5) communication mode; PC5 communication mode and the LTE Uu communication mode of the interface between the LTE base station and the UE; PC5 communication mode and the NR Uu communication mode of the interface between the NR base station and the UE; only LTE Uu communication mode; only NR Uu communication mode.

Optionally, the communication mode reference information includes a correlation between the communication mode and at least one of the following: network monitoring information for the V2X UE; communication status information of the V2X UE; service configuration information.

Optionally, the network monitoring information includes: congestion level information, overload level information, location area information and/or effective time zone information; and/or, the service configuration information includes service configuration identification information, or service configuration index information.

Optionally, the service configuration information includes: communication mode information, third pre-configured information, and service configuration identification information or service configuration index information; wherein, the third pre-configured information includes at least one of the following: transmission environment scenario information; location area information; density information; speed information; congestion level information; overload level information; service identification information.

An embodiment of the present disclosure provides an information processing method, is applied to an V2X UE, and includes: receiving communication mode decision information sent by a first server; wherein, the communication mode decision information is obtained according to network monitoring information and/or current communication status information of the V2X UE, and service configuration information; there being a correlation between the communication mode decision information and an V2X service.

Optionally, the communication mode decision information carries at least one of the following: target communication mode establishment indication information; target communication mode cancellation indication information; communication mode information; communication mode reference information.

Optionally, the target communication mode includes any one of the following: only the ProSe direct communication interface (PC5) communication mode; PC5 communication mode and the LTE Uu communication mode of the interface between the LTE base station and the UE; PC5 communication mode and the NR Uu communication mode of the interface between the NR base station and the UE; only LTE Uu communication mode; only NR Uu communication mode.

Optionally, the communication mode reference information includes a correlation between the communication mode and at least one of the following: network monitoring information for the V2X UE; communication status information of the V2X UE; service configuration information.

Optionally, the network monitoring information includes: congestion level information, overload level information, location area information and/or effective time zone information; and/or, the service configuration information includes service configuration identification information, or service configuration index information.

Optionally, the communication status information includes at least one of the following: vehicle-to-vehicle communication mode information; identity information of a peer UE of vehicle-to-vehicle communication; service quality information; an identifier of the V2X UE; speed information of the V2X UE; service identification information.

Optionally, the vehicle-to-vehicle communication mode information includes: long term evolution (LTE) Uu communication of an interface between an LTE base station and a UE, ProSe direct communication interface 5 (PC5) communication mode, new radio (NR) Uu communication of an interface between an NR interface base station and a UE and a PC5 communication mode, an LTE Uu communication mode or an NR Uu communication mode; and/or, the identity information of the peer UE of the vehicle-to-vehicle communication includes: client identification information corresponding to a peer V2X UE, the identification information of the peer V2X UE and/or identification information of a peer V2X user; and/or, the quality of service information includes: end-to-end service delay information and/or data packet loss rate information of the V2X UE; and/or, the identifier of the V2X UE includes: client identification information corresponding to the V2X UE, identification information of the V2X UE, and/or identification information of an V2X user.

Optionally, before receiving the communication mode decision information sent by the first server, the method includes: receiving second request information sent by the first server; feeding back second response information to the first server according to the second request information; wherein the second response information carries the communication status information; or, receiving second subscription information sent by the first server; feeding back second notification information to the first server information according to the second subscription information;

wherein the second notification information carries the communication status information.

Optionally, after receiving the communication mode decision information sent by the first server, the method further includes: determining communication mode execution decision information according to the communication mode decision information; wherein, the communication mode execution decision information includes at least one of the following: executing to establish a target communication mode; executing to cancel the target communication mode; executing to determine and establish the target communication mode according to the communication mode reference information.

Optionally, after determining the communication mode execution decision information according to the communication mode decision information, the method further includes: associating the target communication mode with a current related service identifier for a target communication mode that is determined to establish, to obtain service identifier association update information; and/or, de-associating the target communication mode from the current related service identifier for a target communication mode that is determined to be canceled, to obtain the service identifier association update information.

Optionally, after determining the communication mode execution decision information according to the communication mode decision information, the method includes: performing decision information according to the communication mode, performing corresponding operations on the communication mode, obtaining communication mode execution result information.

Optionally, the receiving the communication mode decision information sent by the first server includes: receiving fourth request information sent by the first server, wherein the fourth request information carries the communication mode decision information; or, receiving network monitoring information notification sent by the first server, wherein the network monitoring information notification carries the communication mode decision information.

Optionally, after receiving the fourth request information sent by the first server, the method further includes: feeding back fourth response information to the first server according to the fourth request information.

Optionally, the fourth response information carries communication mode execution decision information and/or service identifier association update information; or, the fourth response information carries communication mode execution result information and/or service identifier association update information.

Optionally, the service configuration information includes: communication mode information, third pre-configured information, and service configuration identification information or service configuration index information; wherein, the third pre-configured information includes at least one of the following: transmission environment scenario information; location area information; density information; speed information; congestion level information; overload level information; service identification information.

An embodiment of the present disclosure provides a server, being a first server, wherein the server includes a memory, a transceiver, and a processor: the memory is used to store computer programs; the transceiver is used to send and receive data under the control of the processor; the processor is used to read the computer programs stored in the memory and perform the following operations: receiving, by the transceiver, first pre-configured information sent by a second server; obtaining communication mode decision information according to the first pre-configured information; sending, by the transceiver, the communication mode decision information to corresponding V2X (V2X) UEs; wherein, the first pre-configured information includes at least one of the following information: service configuration information for at least two V2X UEs; communication mode decision information for the at least two V2X UEs; there being a correlation between the communication mode decision information and an V2X service.

Optionally, in the case that the first pre-configured information includes service configuration information, the obtaining communication mode decision information according to the first pre-configured information includes: obtaining network monitoring information for the at least two V2X UEs and/or current communication status information of each V2X UE; and obtaining the communication mode decision information according to the network monitoring information and/or communication status information, and service configuration information.

Optionally, the obtaining the communication mode decision information according to the network monitoring information and/or communication status information, and service configuration information includes: obtaining real-time information of pre-configured parameters according to the network monitoring information for at least two V2X UEs and/or the current communication status information of each V2X UE; obtaining the communication mode decision information according to the real-time information and the service configuration information; wherein the pre-configured parameters include at least one of the following: a density of V2X UEs within a geographical area where the V2X UEs are located; a transmission environment scenario where the V2X UEs are located; a service experience quality of the V2X UEs; a location area where the V2X UEs are located.

Optionally, when the first pre-configured information includes communication mode decision information, the operations further include: before receiving the first pre-configured information sent by the second server, obtaining network monitoring information for the at least two V2X UEs and/or current communication status information of each V2X UE; sending, by the transceiver, the network monitoring information and/or the communication status information to the second server; or before receiving the first pre-configured information sent by the second server, processing the network monitoring information to obtain communication mode decision reference information; sending, by the transceiver, the communication mode decision reference information and/or the communication status information to the second server.

Optionally, the operations further comprise: after obtaining the network monitoring information for the at least two V2X UEs and/or the current communication status information of each V2X UE, sending, by the transceiver, third request information to the second server; wherein the third request information carries second pre-configured information and the communication status information; the receiving the first pre-configured information sent by the second server includes: receiving, by the transceiver, third response information fed back by the second server according to the third request information, wherein the third response information carries the first pre-configured information; or, sending, by the transceiver, third subscription information to the second server; wherein the third subscription information carries the second pre-configured information and the communication status information; the receiving the first pre-configured information sent by the second server includes:

receiving, by the transceiver, third notification information fed back by the second server according to the third subscription information, wherein the third notification information carries the first pre-configured information; wherein the second pre-configured information includes any one of the following: network monitoring information for the at least two V2X UEs; communication mode decision reference information.

An embodiment of the present disclosure provides a server being a second server, wherein the server comprises a memory, a transceiver, and a processor: the memory is used to store computer programs; the transceiver is used to send and receive data under the control of the processor; the processor is used to read the computer programs stored in the memory and perform the following operations: sending, by the transceiver, first pre-configured information to a first server; wherein, the first pre-configured information includes at least one of the following: service configuration information for at least two V2X UEs; communication mode decision information for the at least two V2X UEs.

Optionally, when the first pre-configured information includes communication mode decision information, the operation further comprises: before sending the first pre-configured information to the first server, receiving, by the transceiver, second pre-configured information sent by the first server and current communication status information of each V2X UE; obtaining communication mode decision information according to the second pre-configured information and/or communication status information, and service configuration information; wherein, the second pre-configured information includes any one of the following: network monitoring information for the at least two V2X UEs; communication mode decision reference information.

Optionally, the obtaining communication mode decision information according to the second pre-configured information and/or communication status information and service configuration information includes: obtaining real-time information of pre-configured parameters according to the second pre-configured information and/or the communication status information; obtaining communication mode decision information according to the real-time information and the service configuration information; wherein the pre-configured parameters include at least one of the following: a density of V2X UEs within a geographical area where the V2X UEs are located; a transmission environment scenario where the V2X UEs are located; a service experience quality of the V2X UEs; a location area where the V2X UEs are located.

Optionally, the receiving the second pre-configured information sent by the first server and the current communication status information of each V2X UE includes: receiving, by the transceiver, third request information sent by the first server; wherein the third request information carries the second pre-configured information and the communication status information; the sending the first pre-configured information to the first server includes: feeding back third response information to the first server according to the third request information, wherein the third response information carries the first pre-configured information; or receiving third subscription information sent by the first server; wherein the third subscription information carries the second pre-configured information and the communication status information; the sending the first pre-configured information to the first server includes: feeding back third notification information to the first server according to the third subscription information, wherein the third notification information carries the first pre-configured information.

An embodiment of the present disclosure provides an V2X UE, including a memory, a transceiver, and a processor: wherein the memory is used to store computer programs; the transceiver is used to send and receive data under the control of the processor; the processor is used to read the computer programs stored in the memory and perform the following operations: receiving, by the transceiver, communication mode decision information sent by a first server; wherein, the communication mode decision information is obtained according to network monitoring information and/ or current communication status information of the V2X UE, and service configuration information; there being a correlation between the communication mode decision information and an V2X service.

Optionally, the operations further comprise: after receiving the communication mode decision information sent by the first server, determining communication mode execution decision information according to the communication mode decision information; wherein, the communication mode execution decision information includes at least one of the following: executing to establish a target communication mode; executing to cancel the target communication mode; executing to determine and establish the target communication mode according to the communication mode reference information.

Optionally, the operations further comprise: after determining the communication mode execution decision information according to the communication mode decision information, associating the target communication mode with a current related service identifier for a target communication mode that is determined to establish, to obtain service identifier association update information; and/or, after determining the communication mode execution decision information according to the communication mode decision information, de-associating the target communication mode from the current related service identifier for a target communication mode that is determined to be canceled, to obtain the service identifier association update information.

Optionally, the operations further comprise: after determining the communication mode execution decision information according to the communication mode decision information, performing decision information according to the communication mode, performing corresponding operations on the communication mode, obtaining communication mode execution result information.

An embodiment of the present disclosure provides an information processing device, applied to a first server, comprising: a first receiving unit, configured to receive first pre-configured information sent by a second server; a first processing unit, configured to obtain communication mode decision information according to the first pre-configured information; send the communication mode decision information to corresponding V2X UEs; wherein, the first pre-configured information includes at least one of the following information: service configuration information for at least two V2X UEs; communication mode decision information for the at least two V2X UEs; there being a correlation between the communication mode decision information and an V2X service.

An embodiment of the present disclosure provides an information processing device, applied to a second server, comprising: a fifth sending unit, configured to send first pre-configured information to a first server; wherein, the first pre-configured information includes at least one of the following: service configuration information for at least two V2X UEs; communication mode decision information for the at least two V2X UEs.

An embodiment of the present disclosure provides an information processing device, applied to an V2X UE, comprising: A fifth receiving unit, configured to receive communication mode decision information sent by a first server;

wherein, the communication mode decision information is obtained according to network monitoring information and/or current communication status information of the V2X UE, and service configuration information; there being a correlation between the communication mode decision information and an V2X service.

An embodiment of the present disclosure provides a processor-readable storage medium, wherein the processor-readable storage medium stores a computer program, the computer program is executed by the processor to implement the steps of the information processing method in the first server side, in the second servicer side or the V2X UE side.

The technical solution of the present disclosure achieve the following advantages.

The information processing method provided in the embodiment of the present disclosure receives the first pre-configured information sent by the second server; obtains communication mode decision information according to the first pre-configured information; and sends the communication mode decision information to the corresponding V2X UEs; wherein, the first pre-configured information includes at least one of the following information: service configuration information for at least two V2X UEs; communication mode decision information for the at least two V2X UEs; a correlation between the communication mode decision information and V2X service. Therefore, the network side can determine the decision on the communication mode, and then the decision on the communication mode can not only consider the network status, but also consider the impact of service quality of the V2X high layer, the temporal and spatial changes in traffic information on communication mode decision; thereby avoiding the switching between communication modes of V2V communication is determined by UE alone, which may reduce the performance and stability of V2X overall service quality, and cause local service and network congestion, which solves the problem in the related art that the information processing scheme for switching V2X communication modes will reduce the performance and stability of the overall service quality of V2X, and cause local service and network congestion.

BRIEF DESCRIPTION OF THE DRAWINGS

FIG. 3 is a second schematic flow diagram of an information processing method in an embodiment of the present disclosure;

FIG. 4 is a third schematic flow diagram of the information processing method of the embodiment of the present disclosure;

DETAILED DESCRIPTION

The technical solutions in the embodiments of the present disclosure will be clearly and completely described below in conjunction with the accompanying drawings in the embodiments of the present disclosure. Obviously, the described embodiments are only some of the embodiments of the present disclosure, not all of them. Based on the embodiments in the present disclosure, all other embodiments obtained by a person skilled in the art without creative work belong to the scope of protection of present disclosure.

The term "and/or" in the embodiments of present disclosure describes the association relationship of associated objects, indicating that there may be three relationships, for example, A and/or B, which may mean: A exists alone, A and B exist simultaneously, and B exists alone. The character "/" generally indicates that the contextual objects are an "or" relationship.

The term "a plurality of" in the embodiments of the present disclosure refers to two or more, and other quantifiers are similar.

It is explained here that the technical solutions provided by the embodiments of the present disclosure can be applied to various systems, especially a 5G system. For example, the applicable system may be global system of mobile communication (GSM), code division multiple access (CDMA) system, wideband code division multiple access (WCDMA) system, general packet radio service (GPRS) system, long term evolution (LTE) system, LTE frequency division duplex (FDD) system, LTE time division duplex (TDD) system, Long term evolution advanced (LTE-A) system, universal mobile telecommunications system (UMTS), worldwide interoperability for microwave access (WiMAX) system, 5G New Radio (NR) system, etc. These various systems include V2X UEs and servers. The system may also include a core network part, such as an evolved packet system (EPS), a 5G system (5GS), and the like.

Figure 1:
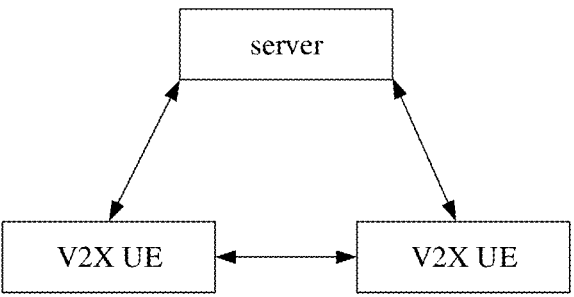
FIG. 1 is a schematic diagram of a wireless communication system architecture according to an embodiment of the present disclosure.

FIG. 1 shows a block diagram of a wireless communication system according to the embodiment of the present disclosure. The wireless communication system includes an V2X UE and a server.

One or more antennas can be used for multi-input multi-output (MIMO) transmission between the server and the V2X UE, and the MIMO transmission can be single user MIMO (SU-MIMO) or multi user MIMO (MU-MIMO). According to the shape and number of antenna combinations, MIMO transmission can be 2D-MIMO, 3D-MIMO, FD-MIMO, or massive-MIMO, or diversity transmission, precoding transmission, or beamforming transmission, etc.

Based on the above, the embodiments of the present disclosure provide an information processing method, device, server, and V2X UE to solve the problem that the information processing scheme for switching of V2X communication modes in the related art will reduce the performance and stability of the overall service quality of V2X, and cause local services and network congestion.

The method, device, server, and V2X UE are based on the same concept. Since the principles of the method, device, server, and V2X UE are similar to solving problems, the implementation of the method, device, server, and V2X UE can be referred to each other, which will not be repeated herein.

Figure 2:
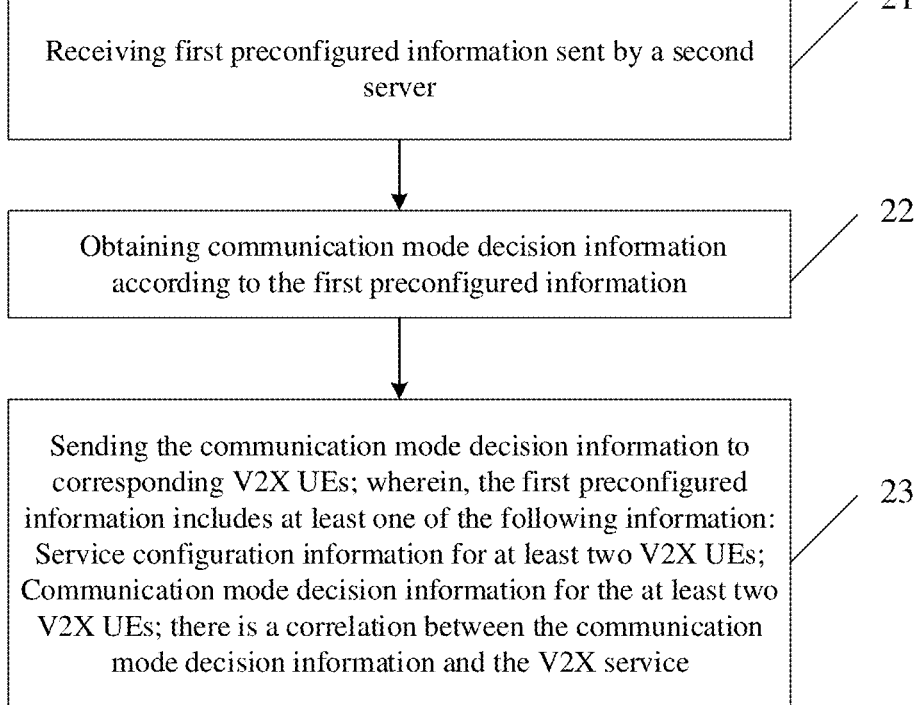
FIG. 2 is a first schematic flow diagram of an information processing method according to an embodiment of the present disclosure.

As shown in FIG. 2, the information processing method provided in the embodiment of the present disclosure is applied to a first server, and includes:

Step 21: Receiving first pre-configured information sent by a second server;

Step 22: Obtaining communication mode decision information according to the first pre-configured information;

Step 23: Sending the communication mode decision information to corresponding V2X UEs;

Wherein, the first pre-configured information includes at least one of the following information:

Service configuration information for at least two V2X UEs;

Communication mode decision information for the at least two V2X UEs;

There is a correlation between the communication mode decision information and V2X service.

Specifically, the first server may correspond to a vertical application enabler (VAE) server in an actual architecture; the second server may correspond to a V2X application specific server in an actual architecture.

The information processing method provided in the embodiment of the present disclosure receives the first pre-configured information sent by the second server; obtains communication mode decision information according to the first pre-configured information; and sends the communication mode decision information to the corresponding V2X UEs; wherein, the first pre-configured information includes at least one of the following information: service configuration information for at least two V2X UEs; communication mode decision information for the at least two V2X UEs; a correlation between the communication mode decision information and V2X service. Therefore, the network side can determine the decision on the communication mode, and then the decision on the communication mode can not only consider the network status, but also consider the impact of service quality of the V2X high layer, the temporal and spatial changes in traffic information on communication mode decision; thereby avoiding the switching between communication modes of V2V communication is determined by UE alone, which may reduce the performance and stability of V2X overall service quality, and cause local service and network congestion, which solves the problem in the related art that the information processing scheme for switching V2X communication modes will reduce the performance and stability of the overall service quality of V2X, and cause local service and network congestion.

Wherein, in the case that the first pre-configured information includes service configuration information, the obtaining communication mode decision information according to the first pre-configured information includes: obtaining network monitoring information for the at least two V2X UEs and/or current communication status information of each of the V2X UEs; and obtaining the communication mode decision information according to the network monitoring information and/or communication status information, and service configuration information.

Specifically, the obtaining the communication mode decision information according to the network monitoring information and/or communication status information, and service configuration information includes: obtaining real-time information of pre-configured parameters according to the network monitoring information for at least two Internet of Vehicle UEs and/or the current communication status information of each of the V2X UE; obtaining the communication mode decision information according to the real-time information and the service configuration information; wherein the pre-configured parameters include at least one of the following parameters: a density of V2X UEs within a geographical area where the V2X UEs are located; a transmission environment scenario where the V2X UEs are located; a service experience quality of the V2X UEs; a location area where the V2X UEs are located.

In this embodiment of the present disclosure, the receiving the first pre-configured information sent by the second server includes: sending first request information to the second server; receiving a first response information fed back by the second server according to the first request information, the first response information carrying the first pre-configured information; or, sending first subscription information to the second server; receiving first notification information fed back by the second server according to the first subscription information, the first notification information carrying the first pre-configured information.

The first request/response/subscription/notification information (that is, the first request information, first response information, first subscription information or first notification information) can be any of the following information:
  Service configuration request/response/subscription/notification information;
  Service requirement request/response/subscription/notification information;
  Application requirement request/response/subscription/notification information;
  Application configuration request/response/subscription/notification information;
  PC5 parameter provisioning request/response/subscription/notification information.

In the actual architecture, the first request/response/subscription/notification information can be transmitted on the Vs interface (the interface between the VAE Server and the V2X Application Specific Server).

In this embodiment of the present disclosure, when the first pre-configured information includes communication mode decision information, before receiving the first pre-configured information sent by the second server, the method further includes: obtaining network monitoring information for the at least two V2X UEs and/or current communication status information of each of the V2X UEs; sending the network monitoring information and/or the communication status information to the second server; or processing the network monitoring information, obtaining communication mode decision reference information; sending the communication mode decision reference information and/or communication status information to the second server.

Wherein, the communication status information includes at least one of the following information: vehicle-to-vehicle communication mode information; identity information of a peer UE of vehicle-to-vehicle communication; service quality information; an identifier of the V2X UE; speed information of the V2X UE; service identification information.

Specifically, the service identification information may correspond to a V2X Service ID, and the V2X Service ID may be an Intelligent Traffic System Application Identifier (ITS-AID) or a Provider Service Identifier (PSID).

In the embodiment of the present disclosure, the vehicle-to-vehicle communication mode information includes: LTE Uu communication of interface between a long term evolved base station and a UE, ProSe direct communication interface 5 (PC5) communication mode, the NR Uu communication of the interface between a new radio interface base station and the UE and PC5 communication mode, LTE Uu communication mode or NR Uu communication mode; and/or, the identity information of the peer UE of the vehicle-to-vehicle communication includes: client identification information corresponding to a peer V2X UE, the identification information of the peer V2X UE and/or identification information of a peer V2X user; and/or, the quality of service information includes: end-to-end service delay information and/or data packet loss rate information of the V2X UE; and/or, the identifier of the V2X UE includes: client identification information corresponding to the V2X UE, identification information of the V2X UE, and/or identification information of an V2X user.

Wherein, the obtaining the current communication status information of each of the V2X UEs includes: sending second request information to the V2X UE; receiving second response information fed back by the V2X UE according to the second request information; wherein the second response information carries the communication status information; or, sending second subscription information to the V2X UE; receiving second notification information fed back by the V2X UE according to the second subscription information; wherein the second notification information carries the communication status information.

Information about the second request/response/subscription/notification (that is, the second request information, the second response information, the second subscription information or the second notification information) can be any of the following information:

Communication status request/response/subscription/notification information;

Connectivity status request/response/subscription/notification information;

V2V communication status request/response/subscription/notification information;

Service monitoring request/response/subscription/notification information;

Communication status monitoring request/response/subscription/notification information.

The second request message includes service identification information.

The second request/response/subscription/notification information can be transmitted on the V1-AE interface (the application layer interface between the VAE Server and the VAE client) in the actual architecture.

In the embodiment of the present disclosure, the obtaining the network monitoring information for the at least two V2X UEs includes: interacting with a core network to obtain the network monitoring information.

Further, after obtaining the network monitoring information for the at least two V2X UEs and/or the current communication status information of each of the V2X UEs, the method further includes: sending third request information to the second server; wherein the third request information carries the second pre-configured information and the communication status information; the receiving the first pre-configured information sent by the second server includes: receiving third response information fed back by the second server according to the third request information, wherein the third response information carries the first pre-configured information; or, sending third subscription information to the second server; wherein the third subscription information carries the second pre-configured information and the communication status information; the receiving the first pre-configured information sent by the second server includes: receiving third notification information fed back by the second server according to the third subscription information, wherein the third notification information carries the first pre-configured information; the second pre-configured information includes any one of the following information: network monitoring information for the at least two V2X UEs; communication mode decision reference information.

The information about the third request/response/subscription/notification (that is, the third request information, the third response information, the third subscription information or the third notification information) can be any of the following information:

Communication mode request/response/subscription/notification information;

Connectivity mode request/response/subscription/notification information;

V2V communication mode request/response/subscription/notification information.

In the actual architecture, the third request/response/subscription/notification information can be transmitted on the Vs interface (the interface between the VAE Server and the V2X Application Specific Server).

In the embodiment of the present disclosure, the sending the communication mode decision information to each corresponding V2X UE includes: sending fourth request information to the V2X UE, wherein the fourth request information carries the communication mode decision information; or, sending network monitoring information notification to the V2X UE, wherein the network monitoring information notification carries the communication mode decision information.

Further, after sending the fourth request information to the V2X UE, the method further includes: receiving fourth response information fed back by the V2X UE according to the fourth request information.

The fourth request/response message (that is, the fourth request information or the fourth response information) can be any of the following information:

Communication mode request/response information;

Connectivity mode request/response information;

V2V communication mode request/response information;

Service mode request/response information;

Service configuration request/response information;

V2V service configuration request/response information.

The fourth request/response information can be transmitted on the V1-AE interface (the application layer interface between the VAE Server and the VAE Client) in the actual architecture.

Further, after receiving the fourth response information fed back by the V2X UE according to the fourth request information, the method further includes: sending the fourth response information to the second server.

Wherein, the fourth response information carries communication mode execution decision information and/or service identifier association update information; or, the fourth response information carries communication mode execution result information and/or service identifier association update information.

That is, the fourth response information may carry the decision of UE (for example: whether to accept or not accept the mode decision), or the execution result of the UE (for example: whether the mode switching is successful or unsuccessful).

Specifically, the communication mode execution decision information includes at least one of the following execution decision information: executing to establish a target communication mode; executing to cancel a target communication mode; executing to determine and establish a target communication mode according to communication mode reference information.

In the embodiment of the present disclosure, the communication mode decision information carries any one of the following information: target communication mode establishment indication information; target communication mode cancellation indication information; communication mode information; communication mode reference information.

Information about the communication mode can be a direct communication mode, such as NR Uu+PC5;

The communication mode reference information includes a correlation or mapping relationship with scenario type information, and may also include a correlation or mapping relationship with other information.

In the embodiment of the present disclosure, the target communication mode includes any one of the following modes: only the ProSe direct communication interface PC5 communication mode; PC5 communication and the LTE Uu communication mode of the interface between the long-term evolution base station and the UE; PC5 communication and the NR Uu communication mode of interface between the NR base station and UE; only LTE Uu communication mode; only NR Uu communication mode.

Wherein, the communication mode reference information includes the correlation between the communication mode and at least one of the following information: network monitoring information for the V2X UE; communication status information of the V2X UE; service configuration information.

Specifically, the network monitoring information includes: congestion level information, overload level information, location area information and/or effective time zone information; and/or, the service configuration information includes service configuration identification information, or service configuration index information.

Specifically, the communication mode reference information includes correlation between the communication mode and the following types of information:

1. Correlation between network monitoring information and communication modes. Network monitoring information includes: congestion level, overload level, location area (including cell identification-Cell ID, tracking area identification-Tracking Area ID, geographic location-longitude and latitude), and effective time zone.
2. Correlation between the service quality information (communication status information) reported by the VAE Client and the communication mode.
3. Correlation between service configuration information and communication modes. Here it may be a correlation between service configuration identifier or service configuration related index and the communication mode.

In this embodiment of the present disclosure, the service configuration information includes: communication mode information, third pre-configured information, and service configuration identification information or service configuration index information; wherein, the third pre-configured information includes at least one of the following information: transmission environment scenario information; location area information; density information; speed information; congestion level information; overload level information; service identification information.

It can also be understood that the service configuration information includes:

1. Service configuration identification or index information;
2. Service configuration items, including one or more of the following:

Communication mode (required, at least one communication mode);

At least one of the following: transmission environment scenario; location area; density; speed information; congestion level; overload level.

Specifically, the service identification information may correspond to a V2X Service ID, and the V2X Service ID may be an Intelligent Traffic System Application Identifier (ITS-AID) or a Provider Service Identifier (PSID).

The embodiment of the present disclosure also provides an information processing method, which is applied to a second server, as shown in FIG. 3, including:

Step 31: Sending first pre-configured information to a first server;

Wherein, the first pre-configured information includes at least one of the following information:

Service configuration information for at least two V2X UEs;

Communication mode decision information for the at least two V2X UEs.

Specifically, the first server may correspond to the VAE Server in the actual architecture; the second server may correspond to the V2X Application Specific Server in the actual architecture.

The information processing method provided in the embodiment of the present disclosure sends the first pre-configured information to the first server; wherein, the first pre-configured information includes at least one of the following information: service configuration information for at least two V2X UEs; communication mode decision information for the at least two V2X UEs. Therefore, the network side can determine the decision on the communication mode, and then the decision on the communication mode can not only consider the network status, but also consider the impact of service quality of the V2X high layer, the temporal and spatial changes in traffic information on communication mode decision; thereby avoiding the switching between communication modes of V2V communication is determined by UE alone, which may reduce the performance and stability of V2X overall service quality, and cause local service and network congestion, which solves the problem in the related art that the information processing scheme for switching V2X communication modes will reduce the performance and stability of the overall service quality of V2X, and cause local service and network congestion.

Wherein, when the first pre-configured information includes communication mode decision information, before sending the first pre-configured information to the first server, further includes: receiving the second pre-configured information sent by the first server and current communication status information of each of the V2X UEs; obtaining communication mode decision information according to the second pre-configured information and/or communication status information, and service configuration information; wherein, the second pre-configured information includes any one of the following information: network monitoring information for the at least two V2X UEs; communication mode decision reference information.

Specifically, the obtaining communication mode decision information according to the second pre-configured information and/or communication status information and service configuration information includes: obtaining real time information of pre-configured parameters according to the second pre-configured information and/or communication status information; obtaining communication mode decision information according to the real time information and the service configuration information; wherein the pre-configured parameters include at least one of the following parameters: a density of V2X UEs within a geographical area where the V2X UEs are located; a transmission environment scenario where the V2X UEs are located; a service experience quality of the V2X UEs; a location area where the V2X UEs are located.

Wherein, the communication status information includes at least one of the following information: vehicle-to-vehicle communication mode information; identity information of the vehicle-to-vehicle communication peer UE; service quality information; an identifier of the V2X UE; speed information of the V2X UE; service identification information.

Specifically, the service identification information may correspond to a V2X Service ID, and the V2X Service ID may be an Intelligent Traffic System Application Identifier (ITS-AID) or a Provider Service Identifier (PSID).

In the embodiment of the present disclosure, the vehicle-to-vehicle communication mode information includes: LTE Uu communication of interface between a long term evolved base station and a UE, ProSe direct communication interface 5 (PC5) communication mode, the NR Uu communication of the interface between a new radio interface base station and the UE and PC5 communication mode, LTE Uu communication mode or NR Uu communication mode; and/or, the identity information of the peer UE of the vehicle-to-vehicle communication includes: client identification information corresponding to a peer V2X UE, the identification information of the peer V2X UE and/or identification information of a peer V2X user; and/or, the quality of service information includes: end-to-end service delay information and/or data packet loss rate information of the V2X UE; and/or, the identifier of the V2X UE includes: client identification information corresponding to the V2X UE, identification information of the V2X UE, and/or identification information of an V2X user.

In the embodiment of the present disclosure, the receiving the second pre-configured information sent by the first server and the current communication status information of each of V2X UEs includes: receiving third request information sent by the first server; wherein the third request information carries the second pre-configured information and the communication status information; the sending the first pre-configured information to the first server includes: feeding back the third response information to the first server according to the third request information, wherein the third response information carries the first pre-configured information; or receiving third subscription information sent by the first server; wherein the third subscription information carries the second pre-configured information and the communication status information; the sending the first pre-configured information to the first server includes: feeding back third notification information to the first server according to the third subscription information, wherein the third notification information carries the first pre-configured information.

The information about the third request/response/subscription/notification (that is, the third request information, the third response information, the third subscription information or the third notification information) can be any of the following information:
Communication mode request/response/subscription/notification information;
Connectivity mode request/response/subscription/notification information;
V2V communication mode request/response/subscription/notification information.

In the actual architecture, the third request/response/subscription/notification information can be transmitted on the Vs interface (the interface between the VAE Server and the V2X Application Specific Server).

Wherein, when the first pre-configured information includes service configuration information, sending the first pre-configured information to the first server includes: receiving first request information sent by the first server, feeding back first response information to the first server according to the first request information, wherein the first response information carries the first pre-configured information; or receiving the first subscription information sent by the first server; feeding back first notification information to the first server according to the first subscription information, wherein the first notification information carries the first pre-configured information.

The first request/response/subscription/notification information (that is, the first request information, first response information, first subscription information or first notification information) can be any of the following information:
Service Configuration request/response/subscription/notification information;
Service requirement request/response/subscription/notification information;
Application requirement request/response/subscription/notification information;
Application configuration request/response/subscription/notification information;
PC5 parameter provisioning request/response/subscription/notification information.

In the actual architecture, the first request/response/subscription/notification information can be transmitted on the Vs interface (the interface between the VAE Server and the V2X Application Specific Server).

Further, after sending the first pre-configured information to the first server, the method further includes: receiving fourth response information sent by the first server.

The fourth response message can be any of the following information:
Communication mode response information;
Connectivity mode response information;
V2V communication mode response information;
Service mode response information;
Service configuration response information;
V2V service configuration response information.

Response information can be transmitted on the V1-AE interface (the application layer interface between VAE Server and VAE Client) in the actual architecture.

Wherein, the fourth response information carries communication mode execution decision information and/or service identifier association update information; or, the fourth response information carries communication mode execution result information and/or service identifier association update information.

That is, the fourth response information may carry the decision of UE (for example: whether to accept or not accept the mode decision), or the execution result of the UE (for example: whether the mode switching is successful or unsuccessful).

Specifically, the communication mode decision information carries any one of the following information: target communication mode establishment indication information; target communication mode cancellation indication information; communication mode information; communication mode reference information.

Information about the communication mode can be a direct communication mode, such as NR Uu+PC5;
The communication mode reference information includes a correlation or mapping relationship with scenario type information, and may also include a correlation or mapping relationship with other information.

In the embodiment of the present disclosure, the target communication mode includes any one of the following modes: only the ProSe direct communication interface PC5 communication mode; PC5 communication and the LTE Uu communication mode of the interface between the long-term evolution base station and the UE; PC5 communication and the NR Uu communication mode of interface between the NR base station and UE; only LTE Uu communication mode; only NR Uu communication mode.

In the embodiment of the present disclosure, the communication mode reference information includes a correlation between the communication mode and at least one of the following information: network monitoring information for the V2X UE; communication status information of the V2X UE; service configuration information.

Wherein, the network monitoring information includes: congestion level information, overload level information, location area information and/or effective time zone information; and/or, the service configuration information includes service configuration identification information, or service configuration index information.

Specifically, the communication mode reference information includes correlation between the communication mode and the following types of information:

1. Correlation between network monitoring information and communication modes. Network monitoring information includes: congestion level, overload level, location area (including cell identification-Cell ID, tracking area identification-Tracking Area ID, geographic location-longitude and latitude), and effective time zone.

2. Correlation between the service quality information (communication status information) reported by the VAE Client and the communication mode.

3. Correlation between service configuration information and communication modes. Here it may be a correlation between service configuration identifier or service configuration related index and the communication mode.

In this embodiment of the present disclosure, the service configuration information includes: communication mode information, third pre-configured information, and service configuration identification information or service configuration index information; wherein, the third pre-configured information includes at least one of the following information: transmission environment scenario information; location area information; density information; speed information; congestion level information; overload level information; service identification information.

It can also be understood that the service configuration information includes:

1. Service configuration identification or index information;

2. Service configuration items, including one or more of the following:

Communication mode (required, at least one communication mode);

At least one of the following: transmission environment scenario; location area; density; speed information; congestion level; overload level.

Specifically, the service identification information may correspond to a V2X Service ID, and the V2X Service ID may be an Intelligent Traffic System Application Identifier (ITS-AID) or a Provider Service Identifier (PSID).

Related contents refer to the description on the first server, and details are not repeated here.

The embodiment of the present disclosure also provides an information processing method, which is applied to an V2X UE, as shown in FIG. 4, including:

Step 41: Receiving communication mode decision information sent by a first server;

Wherein, the communication mode decision information is obtained according to network monitoring information and/or current communication status information of the V2X UE, and service configuration information;

There is a correlation between the communication mode decision information and V2X service.

Specifically, the first server may correspond to the VAE Server in an actual architecture.

The information processing method provided in the embodiment of the present disclosure receives communication mode decision information sent by the first server; wherein, the communication mode decision information is obtained based on network monitoring information and/or current communication status information of V2X UE, and service configuration information; there is a correlation between the communication mode decision information and V2X service. Therefore, the network side can determine the decision on the communication mode, and then the decision on the communication mode can not only consider the network status, but also consider the impact of service quality of the V2X high layer, the temporal and spatial changes in traffic information on communication mode decision; thereby avoiding the switching between communication modes of V2V communication is determined by UE alone, which may reduce the performance and stability of V2X overall service quality, and cause local service and network congestion, which solves the problem in the related art that the information processing scheme for switching V2X communication modes will reduce the performance and stability of the overall service quality of V2X, and cause local service and network congestion.

Wherein, the communication mode decision information carries at least one of the following information: target communication mode establishment indication information; target communication mode cancellation indication information; communication mode information; communication mode reference information.

Information about the communication mode can be a direct communication mode, such as NR Uu+PC5;

The communication mode reference information includes a correlation or mapping relationship with scenario type information, and may also include a correlation or mapping relationship with other information.

Specifically, the target communication mode includes any one of the following modes: only the ProSe direct communication interface PC5 communication mode; PC5 communication and the LTE Uu communication mode of the interface between the long-term evolution base station and the UE; PC5 communication and the NR Uu communication mode of interface between the NR base station and UE; only LTE Uu communication mode; only NR Uu communication mode.

Wherein, the communication mode reference information includes the correlation between the communication mode and at least one of the following information: network monitoring information for the V2X UE; communication status information of the V2X UE; service configuration information.

In this embodiment of the present disclosure, the network monitoring information includes: congestion level information, overload level information, location area information and/or effective time zone information; and/or, the service configuration information includes service configuration identification information, or service configuration index information.

Specifically, the communication mode reference information includes correlation between the communication mode and the following types of information:

1. Correlation between network monitoring information and communication modes. Network monitoring information includes: congestion level, overload level, location area (including cell identification-Cell ID, tracking area identification-Tracking Area ID, geographic location-longitude and latitude), and effective time zone.

2. Correlation between the service quality information (communication status information) reported by the VAE Client and the communication mode.

3. Correlation between service configuration information and communication modes. Here it may be a correlation between service configuration identifier or service configuration related index and the communication mode.

Wherein, the communication status information includes at least one of the following information: vehicle-to-vehicle communication mode information; identity information of the vehicle-to-vehicle communication peer UE; service quality information; an identifier of the V2X UE; speed information of the V2X UE; service identification information.

Specifically, the service identification information may correspond to a V2X Service ID, and the V2X Service ID may be an ITS-AID or a PSID. In the embodiment of the present disclosure, the vehicle-to-vehicle communication mode information includes: the communication mode of the LTE Uu communication interface between the long-term evolution base station and the UE, the communication mode of the PC5 communication interface of the proximity service direct communication interface, the NR Uu communication mode of the interface between the new air interface base station and the UE, and the PC5 communication mode, LTE Uu communication mode or NR Uu communication mode; and/or, the identity information of the vehicle-to-vehicle communication opposite UE includes: the client identification information corresponding to the vehicle network UE of the opposite end, the identification information of the V2X UE of the opposite end and/or the UE identification information of the opposite end V2X user identification information; and/or, the quality of service information includes: end-to-end service delay information and/or data packet loss rate information of V2X UE; and/or, the identification of V2X UE Including: the client identification information corresponding to the vehicle network UE, the vehicle network UE identification information and/or the vehicle network user identification information.

Further, before receiving the communication mode decision information sent by the first server, the method further includes: receiving second request information sent by the first server; feeding back second response information to the first server according to the second request information; wherein the second response information carries the communication status information; or, receiving the second subscription information sent by the first server; feeding back second notification information to the first server information according to the second subscription information; wherein the second notification information carries the communication status information.

Information about the second request/response/subscription/notification (that is, the second request information, the second response information, the second subscription information or the second notification information) can be any of the following information:
Communication status request/response/subscription/notification information;
Connectivity status request/response/subscription/notification information;
V2V communication status request/response/subscription/notification information;
Service monitoring request/response/subscription/notification information;
Communication status monitoring request/response/subscription/notification information.

The second request message includes service identification information.

The second request/response/subscription/notification information can be transmitted on the V1-AE interface (the application layer interface between the VAE Server and the VAE Client) in the actual architecture.

Furthermore, after receiving the communication mode decision information sent by the first server, the method further includes: determining communication mode execution decision information according to the communication mode decision information; wherein, the communication mode execution decision information includes at least one of the following execution decision information: executing to establish a target communication mode; executing to cancel the target communication mode; executing to determine and establish the target communication mode according to the communication mode reference information.

In the embodiment of the present disclosure, after determining the communication mode execution decision information according to the communication mode decision information, the method further includes: associating the target communication mode with a current related service identifier for a target communication mode that is determined to establish, to obtain service identifier update information; and/or, de-associating the target communication mode from the current related service identifier for the target communication mode that is determined to be canceled, to obtain service identifier association update information.

Further, after determining the communication mode execution decision information according to the communication mode decision information, the method further includes: performing decision information according to the communication mode, performing corresponding operations on the communication mode, obtaining communication mode execution result information.

Wherein, the receiving the communication mode decision information sent by the first server includes: receiving fourth request information sent by the first server, wherein the fourth request information carries the communication mode decision information; or, receiving network monitoring information notification sent by the first server, wherein the network monitoring information notification carries the communication mode decision information.

Further, after receiving the fourth request information sent by the first server, the method further includes: feeding back fourth response information to the first server according to the fourth request information.

The fourth request/response message (that is, the fourth request information or the fourth response information) can be any of the following information:
Communication mode request/response information;
Connectivity mode request/response information;
V2V communication mode request/response information;
Service mode request/response information;
Service configuration request/response information;
V2V service configuration request/response information.

The fourth request/response information can be transmitted on the V1-AE interface (the application layer interface between the VAE Server and the VAE Client) in the actual architecture.

Wherein, the fourth response information carries communication mode execution decision information and/or service identifier association update information; or, the fourth response information carries communication mode execution result information and/or service identifier association update information.

That is, the fourth response information may carry the decision of UE (for example: whether to accept or not accept the mode decision), or the execution result of the UE (for example: whether the mode switching is successful or unsuccessful).

Specifically, the service configuration information includes: communication mode information, third pre-configured information, and service configuration identification information or service configuration index information; wherein, the third pre-configured information includes at least one of the following information: transmission environment scenario information; location area information; density information; speed information; congestion level information; overload level information; service identification information.

It can also be understood that the service configuration information includes:

1. service configuration identification or index information;
2. service configuration items, including one or more of the following:
   Communication mode (required, at least one communication mode);
   At least one of the following is included: transmission environment scenario; location area; density; speed information; congestion level; overload level.

Specifically, the service identification information may correspond to a V2X Service ID, and the V2X Service ID may be an ITS-AID or a PSID.

Related contents refer to the description of the first server and/or the second server, and details are not repeated here.

The information processing method provided by the embodiment of the present disclosure will be illustrated below in conjunction with multiple sides such as V2X UE, the first server, and the second server. The first server takes VAE Server as an example, and the second server takes V2X Application Specific Server as an example, the V2X UE is hereinafter referred to as V2X UE.

Figure 5:
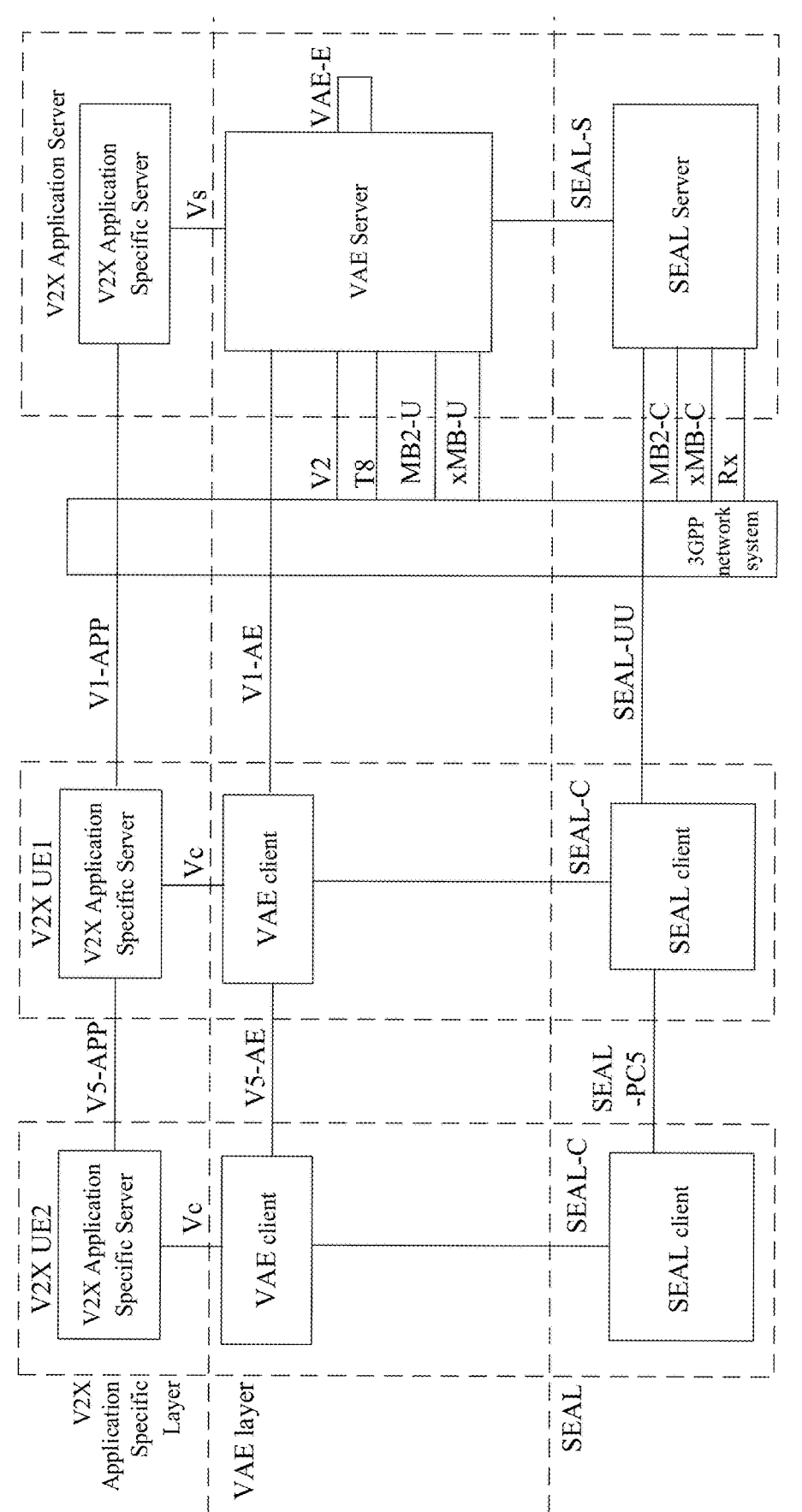
FIG. 5 is a schematic diagram of a V2X application layer architecture in an embodiment of the present disclosure.

In view of the above-mentioned technical problems, the embodiment of the present disclosure provides an information processing method, which can solve the problem that the V2X application layer lacks service functions to support network to participate decision-making and select V2V communication mode. In addition, the implementation of this solution can be based on the V2X application layer architecture shown in FIG. 5; wherein, the architecture includes three layers: V2X application specific layer, Vertical application enabler layer (VAE layer) and Service enabler application layer (SEAL layer). The functions of each functional entity and interface are as follows.

VAE Server: the V2X application enabling server, specifically: an application server that abstracts and refines the low-level network interaction functions of the mobile communication network (such as: network resource management, location tracking, message distribution, file transfer, network monitoring, and some service management functions, etc.) and provides unified capabilities and interfaces to a specific application server;

VAE Client: the V2X application enabling client, which is used to provide support for message services, file transfers, network monitoring events, communication mode switching, location enhancement, and some service management functions; communicate with VAE Clients of other UEs through V5-AE interface;

SEAL Server(s): the service enabling application layer server, which is used to provide unified management services for service servers across different vertical industries, including group management, user authentication management, configuration management, location management, network resource management, etc.;

SEAL Client(s): service enabling application layer client, which is used to provide relevant management service support for UEs across different vertical industries, including group management, user authentication management, configuration management, location management, network resource management and other functions;

V2X Application Specific Server represents a server with V2X specific application.

V2X Application Specific Client represents a client with V2X specific application.

V1-AE: the application layer interface between VAE Server and VAE Client. This interface supports Uu interface transmission.

V5-AE: the application layer interface between VAE Client and VAE Client. This interface supports PC5 interface transmission.

V1-APP: the application layer interface between V2X Application Specific Server and Client.

V5-APP: the application layer interface between V2X Application Specific Client and V2X Application Specific Client.

Vs: the interface between the VAE Server and the V2X Application Specific Server. The VAE Server provides the application programming interface (API) of the V2X application enabling service to the V2X Application Specific Server through this interface.

Vc: the interface between the VAE Client and the V2X Application Specific Client. This interface is an API that provides the V2X application enabling function inside the UE.

SEAL-C: the interface between SEAL Client and VAE Client. This interface is an API for enabling application services inside the UE.

SEAL-PC5: the interface between SEAL Client and SEAL Client. This interface supports PC5 transmission.

SEAL-UU: the application layer interface between SEAL Server and SEAL Client. This interface supports unicast transmission.

SEAL-S: the interface between SEAL Server and VAE Server. The SEAL Server provides API of the application enabling service to the VAE Server through this interface.

V2: the interface between the VAE Server and the V2X control function of the EPS core network.

T8: the interface between the VAE Server and the service capability exposure function (SCEF) entity of the core network, which is used for the VAE Server to obtain the capability open information provided by the core network.

MB2-U: the multicast user plane interface between the VAE Server and the Broadcast Multicast-Service Center (BM-SC).

MB2-C: the multicast control plane interface between SEAL Server and BM-SC.

xMB-U: the multicast user plane interface between the VAE Server and the BM-SC.

xMB-C: the multicast control plane interface between SEAL Server and BM-SC.

Rx: the interface between SEAL Server and Policy and Charging Rules Function (PCRF).

VAE-E: the interface between VAE Server and VAE Server.

In the embodiment of the present disclosure, V2V communication includes two modes: a mode based on the Uu interface (network connection mode) and a mode based on the PC5 interface (direct connection mode). The mode based on the Uu interface refers to the communication mode in which V2X service messages need to be sent to the base station through the Uu interface (LTE Uu or NR Uu), and then sent to the target V2X UE by the base station. The mode based on the PC5 interface refers to the communication mode in which V2X service messages are directly transmitted between V2X UEs through the PC5 interface without passing through the base station. Under specific service requirements and communication environments, V2X UEs can adopt Uu mode, PC5 mode, or both Uu and PC5 modes.

In addition, the solution provided by the embodiment of the present disclosure also considers the following.

(1) The input that affects the V2V communication mode includes the following application layer factors:

The V2X communication transmission environment scenario where the current vehicle is located: such as urban line-of-sight (LOS) (line-of-sight transmission), urban non-line-of-sight (NLOS) (non-line-of-sight transmission)), high-speed LOS, etc. (the communication channel model corresponding to each scenario may be different, and the V2X communication environment can be very complex, the actual environment or scenario may be provided by the V2X service provider according to the traffic geographical environment factors, the actual environment or scenario needs to be provided by the V2X application layer).

Vehicle density: When the vehicle density is high, a large amount of information interaction between vehicles is likely to exceed the congestion of the service website. Using PC5 direct connection can greatly improve network performance (the range of defining vehicle density may be set by the application layer service, it can correspond to a zone that can be identified by the Radio Access Network (RAN) side, or it can be a different geographical range defined by an application layer, and there may be a certain mapping relationship between the geographical range and the Zone).

Service quality of experience: such as service delay requirements, which refers to the delay of service data from the data entry of the application layer at the sending end to the data exit of the application layer at the receiving end (generally at least including service delay and packet loss rate information), the service delay needs to be provided by the application layer.

Area-related service restrictions: such as the correlation between Geographical area and user privacy requirements (for example, users are not allowed to use V2V direct connection communication in a specific geographical area due to privacy requirements), or V2V direct connection communication is not allowed within a specific geographical area.

(2) The decision of the V2V communication mode is determined by each individual V2X UE without the participation of the application server. Therefore, unified scheduling cannot be performed according to the service strategy, and the above-mentioned overall application environment factors (including vehicle density, current traffic geographic environment, transmission environment scenarios, and the quality of service experience of other surrounding V2V communication vehicles, etc.) are not considered, which may cause communication mode conversion failure or local performance degradation of the network, or cause the application server to crash due to excessive vehicle density.

(3) At present, the application layer server does not know the V2V communication status of the V2X UE, which is not conducive to overall service scheduling.

Based on the above, the solutions provided in the embodiments of the present disclosure are illustrated below.

In this solution: the decision of the V2V communication mode requires V2X service configuration (including the correlation between the V2V communication mode and related data), as well as the communication status information of the V2X UE (the VAE Client directly provides the same to the VAE Server) or network monitoring information (EPC or 5GC provides the same to VAE Server).

Figure 6:
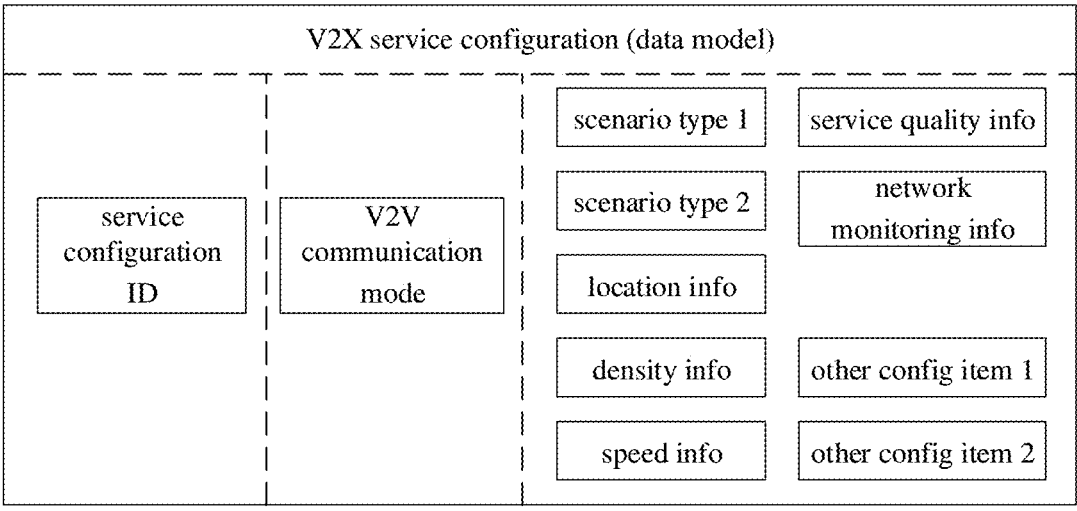
FIG. 6 is a schematic diagram of a V2X service configuration data model in an embodiment of the present disclosure.

Among them, the V2X service configuration data model can be specifically shown in FIG. 6 (for providing the configuration table in FIG. 7), involving: service configuration ID, V2V communication mode, scenario type 1, scenario type 2, location information, density information, speed information, service quality information, network monitoring information, other configuration item 1, other configuration item 2, etc.; here, scenario type 1 and scenario type 2 are just for examples, and there may actually be one or more transmission environment scenarios, which is not limited here. Similarly, other configuration item 1 and other configuration item 2 are just for examples, and there may be one or more configuration items in practice.

Figure 7:
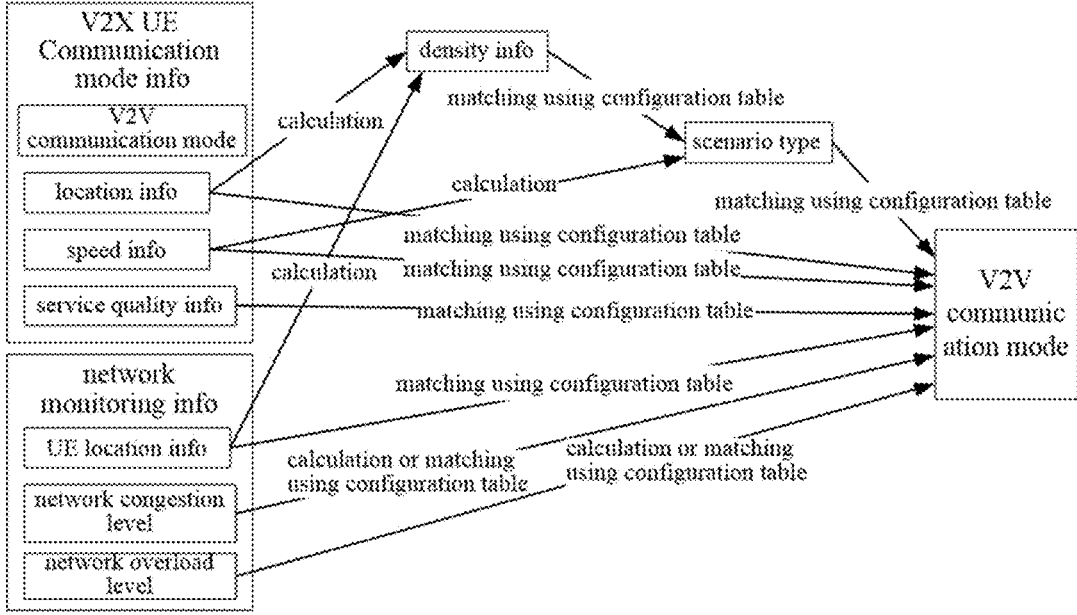
FIG. 7 is a correlation between various input data and V2V communication modes in the embodiment of the present disclosure.

The data relationship between various input data and the generation of V2V communication mode can be shown in FIG. 7:

The density information can be obtained by calculating the location information in the V2X UE communication status information and/or the UE location information in the network monitoring information, matching the density information through the configuration table to obtain the scenario type, and then matching the scenario type through the configuration table to obtain the V2X communication mode; or, The scenario type can be obtained through calculation according to the speed information in the V2X UE communication status information, and then the scenario type can be matched through the configuration table to obtain the V2X communication mode; or, The V2X communication mode can be obtained by matching using the configuration table according to the location information and speed information in the V2X UE communication status information and/or the UE location information in the network monitoring information; or, The V2X communication mode can be obtained through calculation or matching using configuration table according to the service quality information in the V2X UE communication status information, the network congestion level and/or the network overload level in the network monitoring information.

In addition, V2X communication mode can also be obtained by comprehensive matching of several types of information used or generated in the above process (including: V2X UE location information, density information, speed information, scenario type, network congestion level, network overload level, and service quality information).

In general, the matching of the communication mode may be based on one or more factors (such as those arrows pointing to the communication mode in FIG. 7), and the specific matching method is not limited here.

This solution can be specifically implemented as a V2V communication mode conversion method applied to the application server on the network side, and three examples are provided below.

Example One

Figure 8:
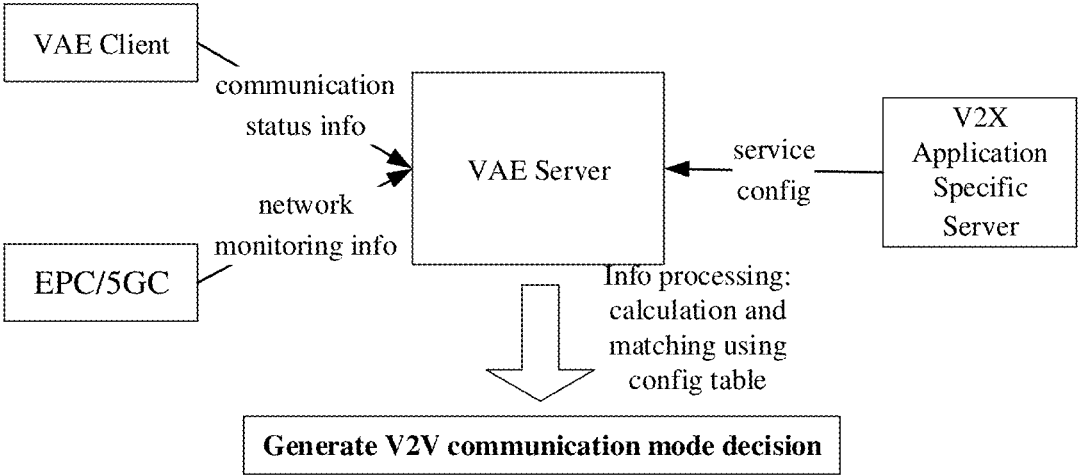
FIG. 8 is a schematic diagram of a first implementation principle of the information processing method of the embodiment of the present disclosure.

The principle of this example is shown in FIG. 8. The VAE Client of the V2X UE provides communication status information to the VAE Server, the EPC or 5GC provides network monitoring information to the VAE Server, and the V2X Application Specific Server provides service configuration to the VAE Server; VAE Server performs information processing (calculation and matching using configuration table) according the three information, to generate a V2V communication mode decision (that is, the above-mentioned communication mode decision information).

Two examples are provided below for Example one.

Example 1A

Figure 9:
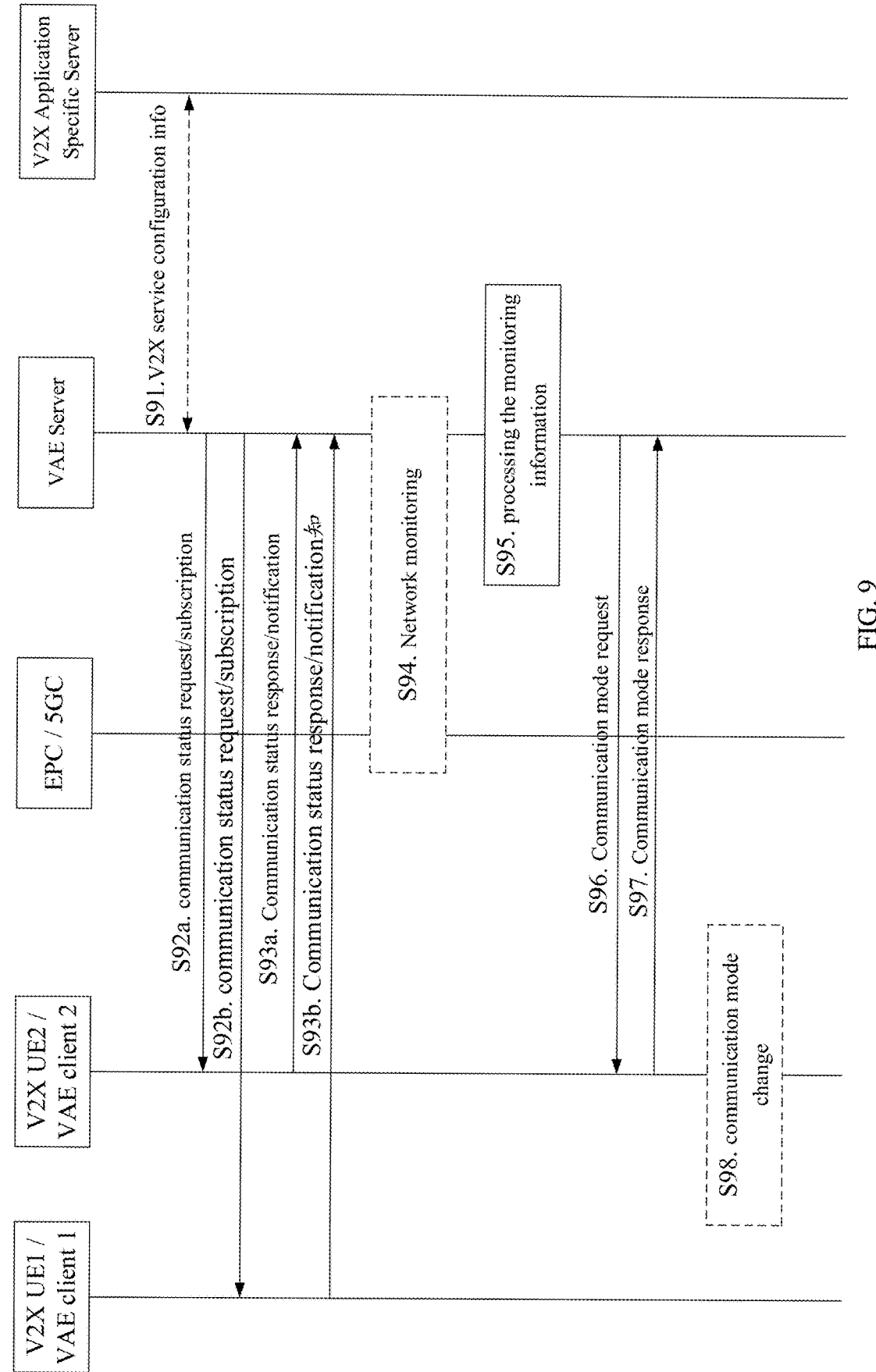
FIG. 9 is a schematic diagram of a first specific flow chart of an information processing method according to an embodiment of the present disclosure.

V2V Communication mode conversion and selection method in which VAE Server participates in decision-making (VAE Server generates decision information and defines a new VAE Server-Client request), specifically as shown in FIG. 9, including:

Step 91: (Optional) The V2X Application Specific Server sends the V2X service configuration information to the VAE Server in the form of request and response, or in the form of subscription and notification (specifically, the VAE Server can send a service configuration request or service configuration subscription to V2X Application Specific Server; V2X Application Specific Server feeds back service configuration response or service configuration notification carrying V2X service configuration information to VAE Server).

The service configuration information may include one or more configuration sets, each configuration set includes a configuration identifier (Service Configuration ID), and may include a V2V communication mode corresponding to the configuration ID, and one or more following factor parameters corresponding to V2V communication modes: scenario type, location information, density information, V2X UE moving speed.

(1) Scenario Types may Include:

Urban LOS scenarios (may further include: urban straight LOS);

Urban NLOS scenarios (may further include: urban intersection NLOS, urban curve NLOS);

High-speed LOS scenarios (may further include: high-speed straight NLOS);

High-speed NLOS scenarios (may further include: high-speed curve NLOS);

(2) Location Information may Include:

Geographic location information (such as latitude and longitude) of the V2X UE;

Location accuracy information of the V2X UE;

a geographical area where the V2X UE is located;

a distance range of V2V communication;

(3) Density Information may Include:

The number of V2X UEs within a certain geographical area;

The number of V2X UEs performing V2V communication within a certain geographical area.

Steps 92-93: The VAE Server obtains the current communication status information of the V2X UE through request and response or subscription and notification. Specifically, as shown in steps 92a and 92b in FIG. 9, the Communication monitoring request/subscription represents a communication monitoring request or subscription; the Communication monitoring response/notification in steps 93a and 93b corresponds to representing a communication monitoring response or notification.

Wherein, the communication status information may include V2V communication mode (such as LTE Uu and PC5 mode enabled simultaneously, LTE Uu mode, etc.), V2X UE current geographic location information, V2X UE speed information, and service quality information. The communication status information may also include the service information of the current V2V communication (including the V2X Service ID using the V2V communication, and the information of a peer V2X UE of the corresponding V2V communication). The communication status information also includes the V2X UE identifier and/or the V2X user identifier. Wherein, the V2X service ID may be PSID or Intelligent Traffic System Application Identifier (ITS AID).

Specifically, (1) The V2V Communication Mode may Include any of the Following:

LTE Uu (using Uu transmission) mode;

NR Uu mode;

Mixed LTE Uu mode and PC5 mode;

Mixed NR Uu mode and PC5 mode;

(2) Information of V2V Communication Peer UE Includes One or More of the Following Identifiers:

Peer VAE client ID;

Peer V2X UE ID, UE ID can be General Public Subscription Identifier (GPSI);

Peer V2X user ID;

(3) Service Quality Information may Include:

End-to-end service delay information of V2X UE;

V2X UE data packet loss rate (such as Real-time Transmission Protocol (RTP) packet loss rate) information;

(4) The V2X UE Identifier may Contain One or More of the Following:

VAE client ID;

V2X UE ID, UE ID can be GPSI;

V2X user identifier may be a V2X user ID.

Step 94: (optional) Network monitoring;

Specifically, the VAE Server can also monitor the network status of the V2X UE by interacting with the core network (EPC (representing the evolved packet core network) or 5GC (representing the 5G core network)) at the same time. For LET, the interaction is between VAE Server and SCEF. For 5G, the interaction is between VAE Server and Network Opening Function (NEF).

Step 95: The VAE Server processes the monitoring information; specifically, the VAE Server processes the V2X UE communication status and network monitoring information (information of the V2X UE is monitored), and generates communication mode decision information. The communication mode decision information may correspond to (associate with) a certain V2X service (identified by V2X Service ID) of the V2X UE (identified by VAE Client ID or V2X UE ID).

(1) Communication Mode Decision Information can be:

Recommended V2V communication modes, including at least one or more of the following: LTE Uu mode, NR Uu mode, LTE Uu and PC5 mixed mode, NR Uu and PC5 mixed mode, PC5 mode; or The V2X service configuration set corresponding to the recommended V2V communication mode (see step 91).

(2) VAE Server Makes a Decision on the Communication Mode, which can be One of the Following:

a) The VAE Server obtains the number of V2X UEs within a location area (or the number of V2X UEs performing V2V communication) according to step 92, 93 or 94, and then obtains the density information, and compares the density information with the service configuration information obtained in step 91, and obtain the V2V communication mode matching the current density information;

b) The VAE Server obtains the geographic location information of the peer V2X UE according to step 92 or 93 or 94, and obtains the geographic location information of the peer V2X UE communicating with the VAE Server through step 92 or 93, analyze the relationship between the scenario type and location information in the service configuration information obtained in step 91, and obtains the scenario type and applicable V2V communication mode of V2X UE (can be aimed at V2X UEs in two V2V communication);

c) The VAE Server determines whether to change the V2V communication mode (for example, in the urban NLOS scenario, it is found that network congestion, delay and packet loss rate performance are significantly reduced, and PC5 links need to be added) and the applicable V2V communication mode according to the current service quality of experience information of the V2X UE obtained in step 92 or 93, and based on the density information and scenario type obtained in a) and/or b), and based on the network monitoring information obtained in step 94 (Such as network congestion information, overload information);

d) The VAE Server obtains the geographical location information of the V2X UE according to step 92, 93 or 94, and compares the location information in the service configuration information obtained according to step 91 with the V2V communication mode. When the V2X UE is in a geographical area restricted by a specific communication mode, the applicable V2V communication mode is obtained.

Steps 96-97: The VAE Server sends a Communication mode request to the VAE Client of the V2X UE, and the request contains communication mode decision information, which is corresponding to (associated with) with to a certain V2X service (identified by V2X Service ID) of the V2X UE (identified by the VAE Client ID or V2X UE ID).

The VAE Client responds to the VAE Server (that is, feeding back communication mode respond), and the response contains the information for the VAE Client to execute the communication mode decision (whether to accept it), or the decision information of the VAE Client for the communication mode selection (including the V2V communication mode information); the response also includes the V2X service identifier (V2X Service ID, which can be specifically updated information associated with the service identifier) associated with the mode decision information.

That is, after obtaining the decision information, if the VAE client accepts the new V2V communication mode, the VAE Client will associate the new communication mode with the current relevant service identifier (that is, the identifier of the currently used service, service ID), including:

a) Associating the PC5 only mode with the V2X service ID; or b) Associating PC5+LTE Uu mode with V2X service ID; or c) Associating PC5+NR Uu mode with V2X service ID; or d) associating LTE Uu only mode with V2X service ID; or e) Associating NR Uu only mode with V2X service ID.

Among them, the communication mode decision information may include related information of the direct communication mode, such as target communication mode establishment instruction information, target communication mode cancellation instruction information, communication mode information, etc.; it may also include communication mode reference information;

The communication mode reference information is embodied as: one or more V2V communication modes and a set of corresponding parameters.

Specifically, the parameters include at least one of the following:

Location area (cell identifier-Cell ID, or tracking area identifier-Tracking Area ID, or geographic location-longitude and latitude);

Valid time zone;

service quality information;

network congestion level;

network overload level;

scenario type.

Correlation between service configuration information and communication modes may be a correlation between a service configuration identifier, or a service configuration related index and a communication mode.

Step 98: (Optional) Performing communication mode change;

That is, the V2X UE performs V2V communication mode switching. This step may occur before step 97.

Example 1B

Figure 10:
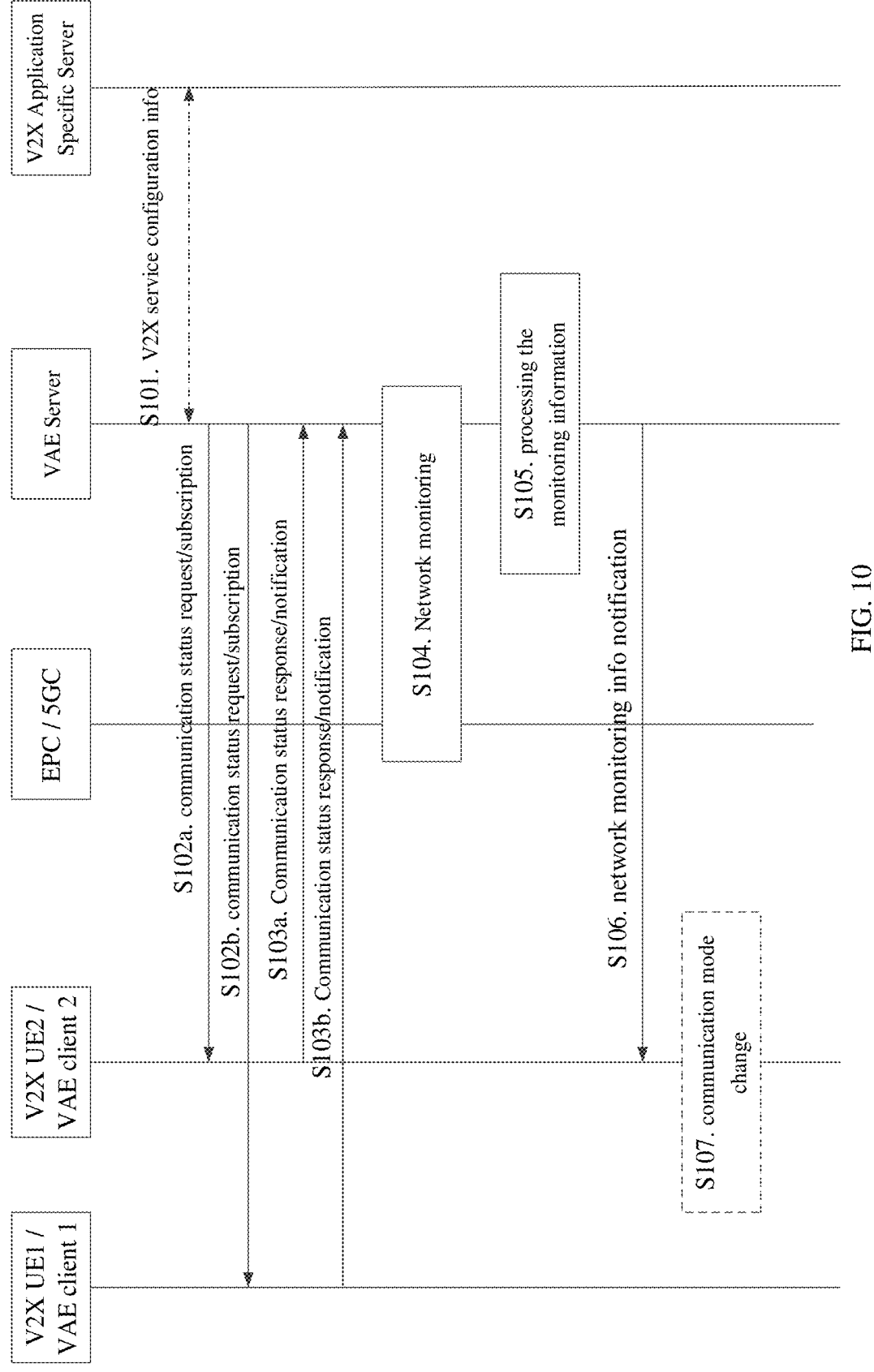
FIG. 10 is a schematic diagram of a second specific flow chart of the information processing method according to the embodiment of the present disclosure.

V2V communication mode conversion and selection method in which VAE Server participates in decision-making (VAE Server generates decision information and reuses VAE Server-Client notification), specifically, as shown in FIG. 10, step 106 in this example reuses the network monitoring information notification in the current message, and the recommended V2V communication mode is newly included in the notification (same as steps 96 and 97 in Example 1A). Other contents refer to Example 1A, which will not be repeated here.

Example Two

Figure 11:
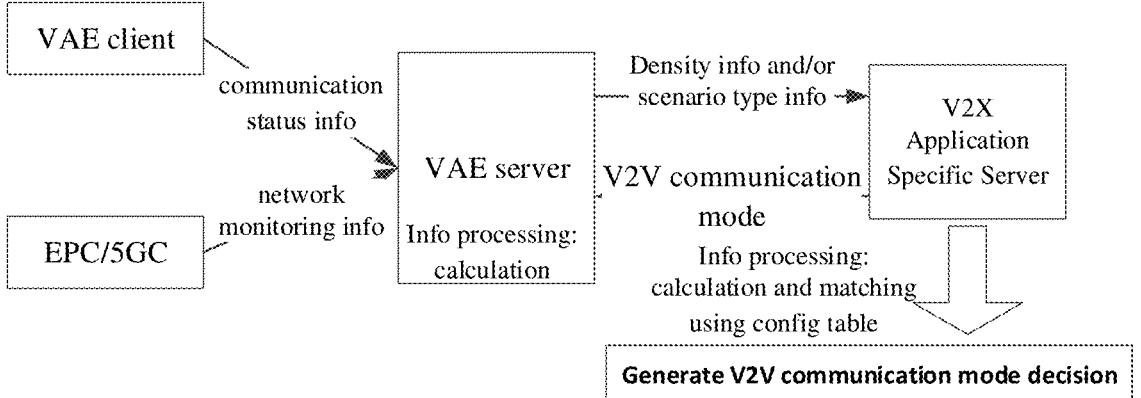
FIG. 11 is the schematic diagram of a second implementation principle of the information processing method according to the embodiment of the present disclosure.

The principle of this example is shown in FIG. 11. The VAE Client of the V2X UE provides communication status information to the VAE Server, and the EPC or 5GC provides network monitoring information to the VAE Server. The VAE Server performs information processing (calculation) based on these two information to obtain density information and/or scenario type information, and send the same to V2X Application Specific Server, V2X Application Specific Server performs information processing (calculation and matching using the configuration table), generates V2V communication mode decision (that is, the above communication mode decision information), and feeds back to VAE Server (that is, the V2V communication mode in is sent to the VAE Server).

Two examples are provided below for the example two.

Example 2A

Figure 12:
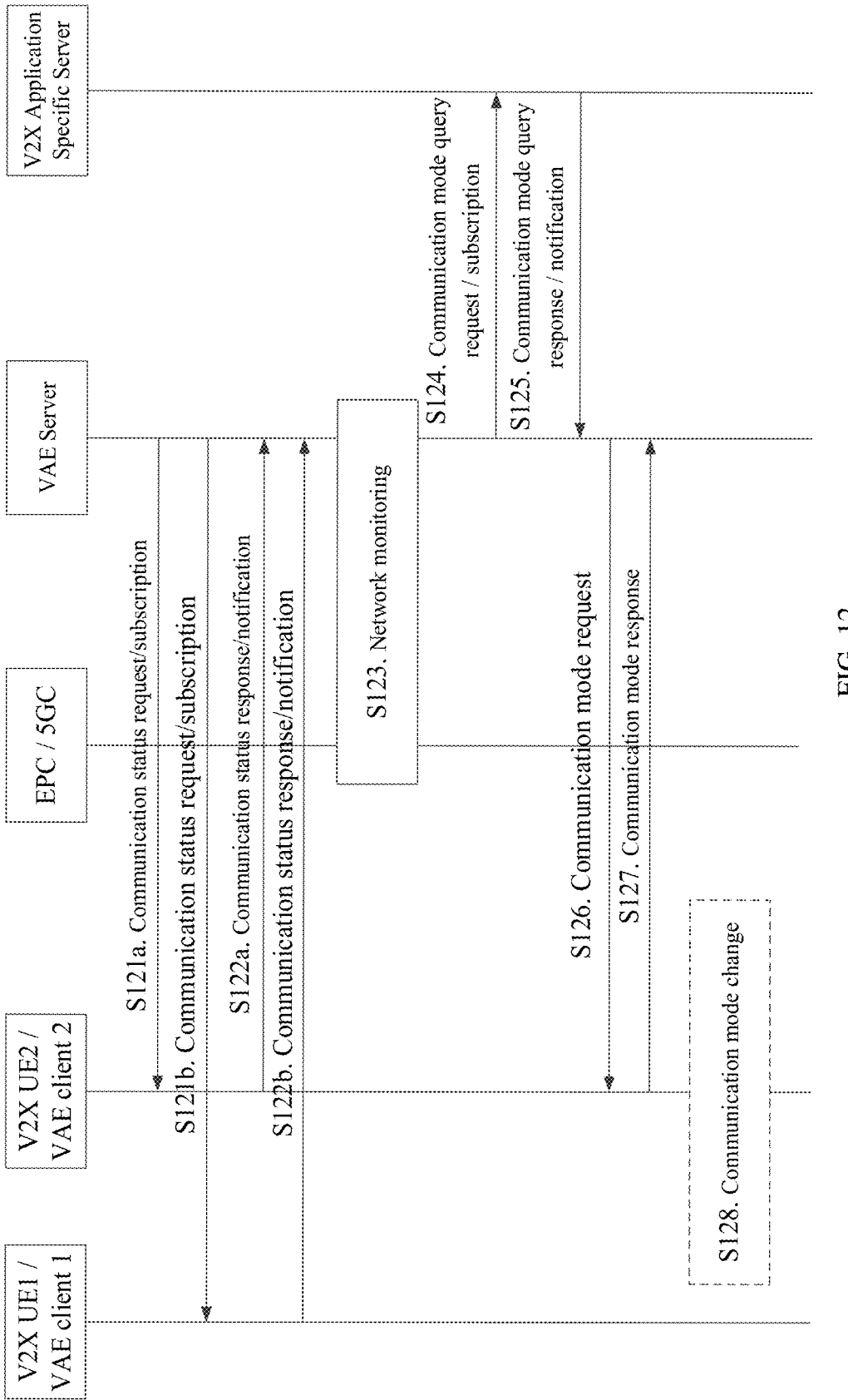
FIG. 12 is a schematic diagram of a third specific flow chart of the information processing method according to the embodiment of the present disclosure.

V2V communication mode conversion and selection method in which V2X Application Specific Server participates in decision-making (VAE Server queries V2X Application Specific Server for decision-making information, and defines a new VAE Server-Client request), specifically as shown in FIG. 12, including:

In steps 121-122, the VAE Server obtains the current communication status information of the V2X UE through request and response or subscription and notification. Specifically, as shown in steps 121a and 121b in FIG. 12, the Communication monitoring request/subscription represents a communication monitoring request or subscription; the Communication monitoring response/notification in steps 122a and 122b corresponds to representing a communication monitoring response or notification.

For details, refer to steps 92-93, which will not be repeated here.

Step 123: (optional) Network monitoring;

For details, refer to step 94, which will not be repeated here.

Step 124: The VAE Server sends a communication mode query request or subscription message (i.e., Communication mode query request/subscription in the figure) to the corresponding V2X Application Specific Server for a specific V2X service of a specific V2X UE, and the message contains the queried V2X service Identifier (Service ID), optionally including the relevant V2X UE identifier (UE ID), and one or more of the following 1) or 2):

1) The communication status information of the V2X UE obtained in step 121 or 122;

2) The network monitoring information obtained in step 123;

and information of 3) and/or 4):

3) The density information obtained by step 121 or 122 or 123 (same as the case a of "VAE Server makes a decision on the communication mode" in step 95 of Example 1A);

4) Scenario type information obtained from 3) and step 121 or 122 or 123 (same as the case b of "the VAE Server makes a decision on the communication mode" in step 95 of Example 1A).

Step 125: The V2X Application Specific Server analyzes and decides the V2V communication mode according to the information obtained in step 124 and the local service configuration information, and sends a communication mode query response or notification message (i.e., Communication mode query response/notification) to the VAE Server. The message includes communication mode decision information and corresponding V2X service identifier.

Specifically, the difference between this example and example 1A:

The VAE Server does not obtain the service configuration information about the V2V communication mode, and does not make decisions about the V2V communication mode; instead, it processes the monitoring information data accordingly, and queries the V2X Application Specific Server for the communication mode information.

The V2X Application Specific Server has the service configuration information, and matches the V2V communication mode according to the data provided by the VAE Server.

Step 126: The VAE Server directly sends the communication mode decision information to the relevant VAE Client. Specifically, the VAE Server sends a Communication mode request to the VAE Client of the V2X UE.

Among them, the communication mode decision information may include related information of the direct communication mode, such as target communication mode establishment instruction information, target communication mode cancellation instruction information, communication mode information, etc.; it may also include communication mode reference information;

The communication mode reference information is embodied as: one or more V2V communication modes and a set of corresponding parameters.

Specifically, the parameters include at least one of the following:

Location area (cell identifier-Cell ID, or tracking area identifier-Tracking Area ID, or geographic location-longitude and latitude);

Valid time zone;

service quality information;

network congestion level;

network overload level;

scenario type.

Correlation between service configuration information and communication modes may be a correlation between a service configuration identifier, or a service configuration related index and a communication mode.

Step 127: The VAE Client responds to the VAE Server (that is, feeding back the communication mode response), and the response contains the information of the VAE Client to perform the communication mode decision (whether to accept it), or the decision information of the VAE Client on the communication mode selection (including V2V communication mode information); the response also includes the V2X service identifier (V2X Service ID, which may specifically be updated information associated with the service identifier) associated with the mode decision information.

That is, after obtaining the decision information, if the VAE client accepts the new V2V communication mode, the VAE Client will associate the new communication mode with the current relevant service identifier (that is, the identifier of the currently used service, service ID), including:

a) Associating the PC5 only mode with the V2X service ID; or b) Associating PC5+LTE Uu mode with V2X service ID; or c) Associating PC5+NR Uu mode with V2X service ID; or d) associating LTE Uu only mode with V2X service ID; or e) Associating NR Uu only mode with V2X service ID.

Step 128: (Optional) Performing a Communication mode change.

Relevant content in this example and example 1A can refer to each other, and will not be repeated here.

Example 2B

Figure 13:
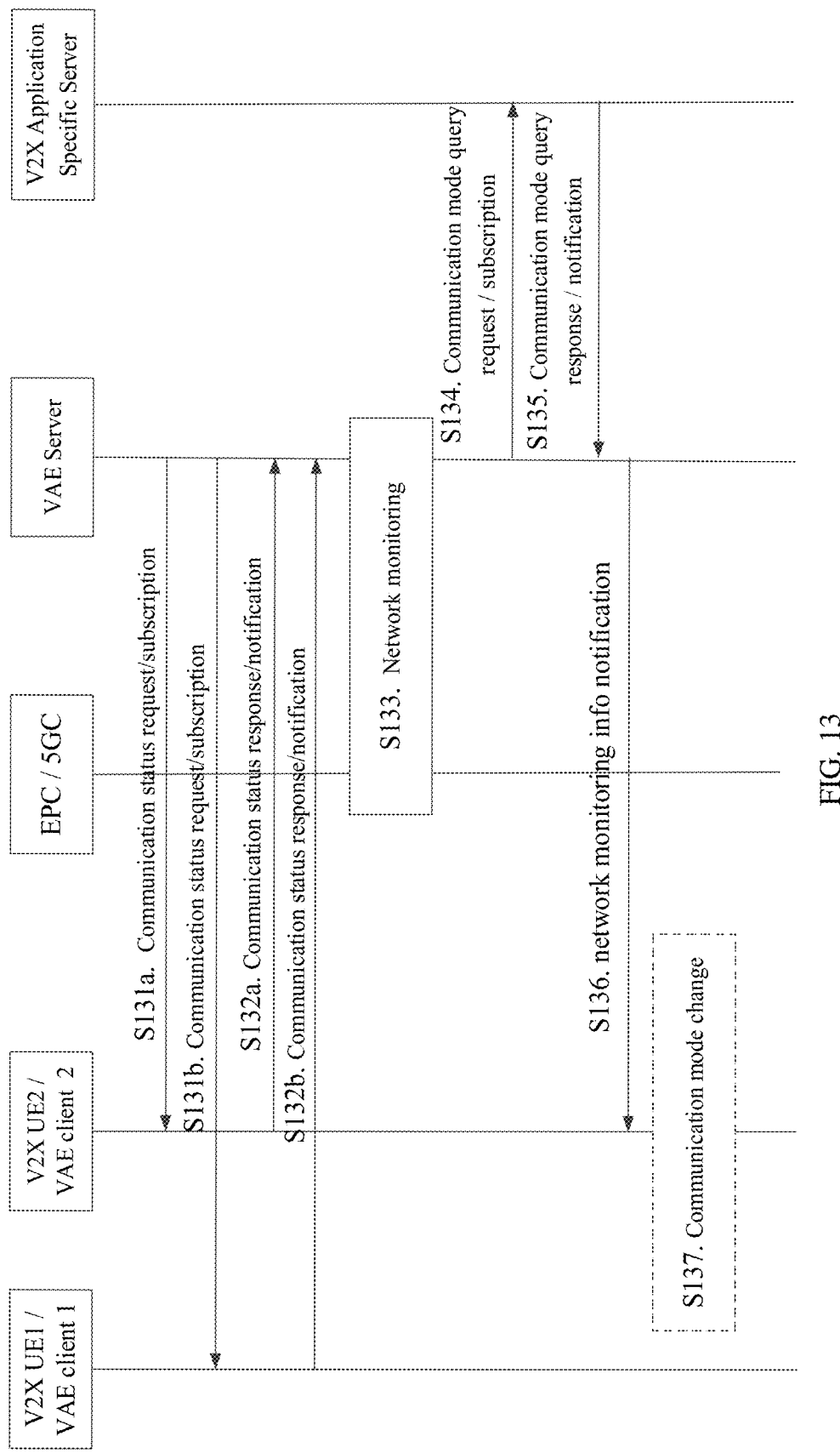
FIG. 13 is a schematic diagram of a fourth specific flow chart of the information processing method according to the embodiment of the present disclosure.

V2V communication mode conversion and selection method where V2X Application Specific Server participates in decision-making (VAE Server queries V2X Application Specific Server for decision-making information, and reuses VAE Server-Client notification), specifically, as shown in FIG. 13, In this example, except that step 136 reuses the network monitoring information in the current message to notify the Network monitoring information notification (including the communication mode decision information obtained in step 135, which is the same as steps 126 and 127 in example 2A), other steps are the same as example 2A, and will not be repeated here.

Regarding the second example, related content of the first example may be referred to, and details are not repeated here.

Example Three

Figure 14:
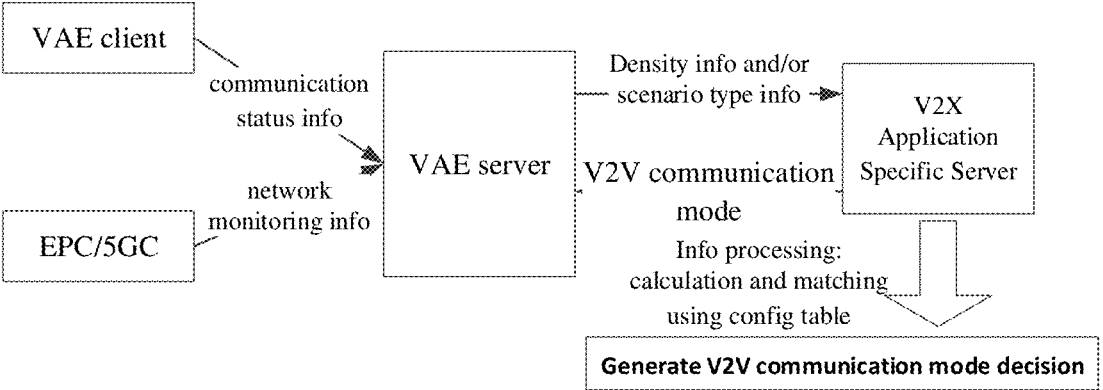
FIG. 14 is the schematic diagram of a third implementation principle of the information processing method according to the embodiment of the present disclosure.

The principle of this example is shown in FIG. 14. The VAE Client of the V2X UE provides communication status information to the VAE Server, the EPC or 5GC provides network monitoring information to the VAE Server, and the VAE Server sends the communication status information and/or network monitoring information to the V2X Application Specific Server, V2X Application Specific Server performs information processing (calculation and matching using the configuration table), generates V2V communication mode decision (that is, the above communication mode decision information), and feeds back to VAE Server (that is, the V2V communication mode is sent to VAE Server).

Two examples are provided below for the example three.

Example 3A

Figure 15:
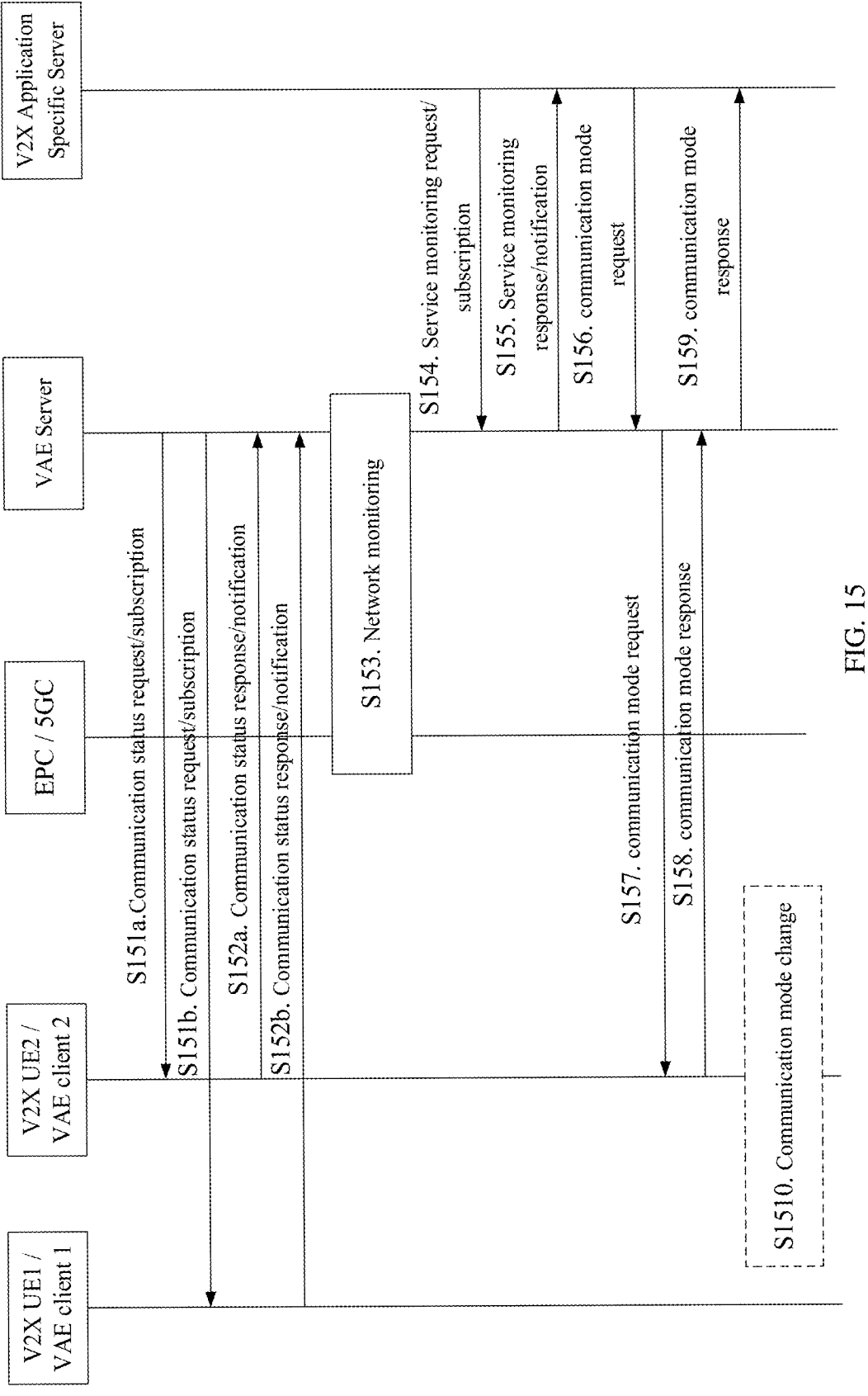
FIG. 15 is a schematic diagram of a fifth specific flow of the information processing method according to the embodiment of the present disclosure.

V2V communication mode conversion and selection method in which V2X Application Specific Server participates in decision-making (V2X Application Specific Server obtains monitoring information from VAE Server and generates decision information, and defines a new VAE Server-Client request), as shown in FIG. 15, include:

In steps 151-152, the VAE Server obtains the current communication status information of the V2X UE through request and response or subscription and notification. Specifically, as shown in steps 151a and 151b in FIG. 15, the Communication monitoring request/subscription represents a communication monitoring request or subscription; the Communication monitoring response/notification in steps 152a and 152b corresponds to representing a communication monitoring response or notification.

For details, refer to steps 92-93, which will not be repeated here.

Step 153: (optional) Network monitoring;

For details, refer to step 94, which will not be repeated here.

Step 154: The V2X Application Specific Server submits a service monitoring request or subscription to the VAE Server (that is, the Service monitoring request/subscription in the figure), and the message may optionally include a V2X user ID or V2X UE ID, and a V2X Service ID.

Step 155: The VAE Server responds to the V2X Application Specific Server with the monitoring information obtained in Step 151 or 152 and/or 153 (that is, feeding back a service monitoring response or notifying Service monitoring response/notification). If step 154 does not include the V2X user ID or V2X UE ID, the VAE Server responds network monitoring information not related to a single V2X UE. If step 154 includes the V2X user ID or V2X UE ID, but does not include the V2X Service ID, then the VAE Server responds the monitoring information of all services of the corresponding V2X UE. If step 154 includes the V2X user ID but does not include the V2X UE ID, the VAE Server determines the VAE Client ID and VAE UE ID associated with the user ID.

Specifically, the difference between this example and examples 1A and 2A is:

The VAE Server does not obtain service configuration information about the V2V communication mode, does not make decisions about the V2V communication mode, and does not perform any processing on monitoring information data.

V2X Application Specific Server has service configuration information, actively obtains monitoring information data from VAE Server and performs corresponding processing, matches V2V communication modes and generates decision information.

Step 156: The V2X Application Specific Server performs corresponding data processing according to the monitoring information data obtained in step 155 and local service configuration information, matches the V2V communication mode and generates decision information. The V2X Application Specific Server sends a communication mode request to the VAE Server, and the message contains the V2X user ID or V2X UE ID, V2X Service ID, and the corresponding V2V communication mode decision.

Steps 157-158: The VAE Server exchanges the communication mode request with the VAE Client (that is, through the Communication mode request and the Communication mode response), carrying the communication mode decision information obtained in step 156. For details, refer to the contents of steps 96 and 97.

Step 159: The VAE Server returns a Communication mode response to the V2X Application Specific Server, which may specifically be the communication mode execution result (whether to accept the decision or not).

Step 1510: (Optional) Performing a Communication mode change.

Relevant content in this example and example 1A can refer to each other, and will not be repeated here.

Example 3B

Figure 16:
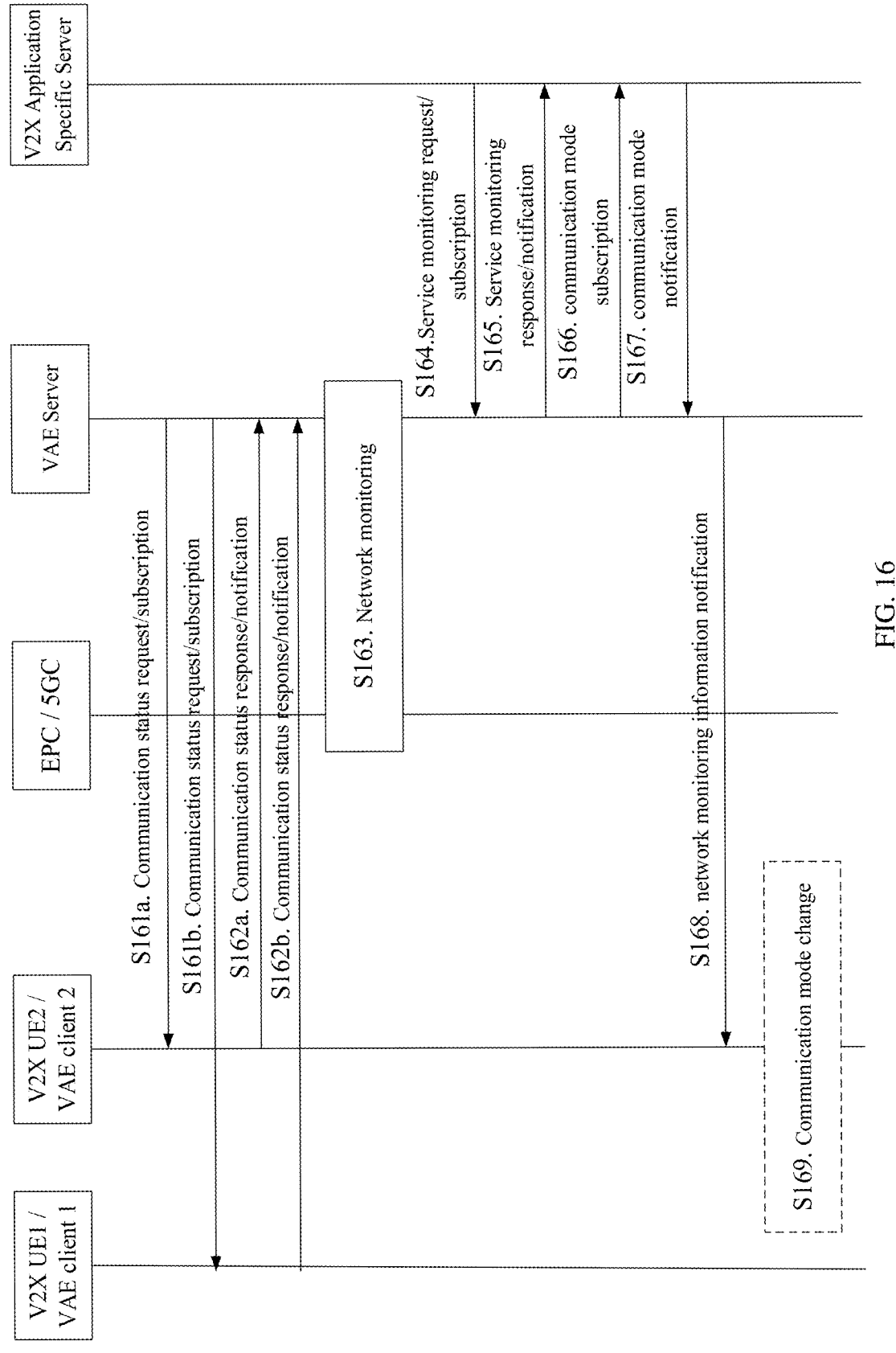
FIG. 16 is a schematic diagram of a sixth specific flow of the information processing method according to the embodiment of the present disclosure.

V2V communication mode conversion and selection method where V2X Application Specific Server participates in decision-making (V2X Application Specific Server obtains monitoring information from VAE Server and generates decision information, and reuses VAE Server-Client notification), specifically, as shown in FIG. 16, include:

In steps 161-162, the VAE Server obtains the current communication status information of the V2X UE through request and response or subscription and notification. Specifically, as shown in steps 161a and 161b in FIG. 16, the Communication monitoring request/subscription represents a communication monitoring request or subscription; the Communication monitoring response/notification in steps 162a and 162b corresponds to representing a communication monitoring response or notification.

For details, refer to steps 92-93, which will not be repeated here.

Step 163: (optional) Network monitoring;

For details, refer to step 94, which will not be repeated here.

Step 164: The V2X Application Specific Server submits a service monitoring request or subscription to the VAE Server (that is, the Service monitoring request/subscription), and the message may optionally include a V2X user ID or V2X UE ID, and a V2X Service ID.

Step 165: The VAE Server responds to the V2X Application Specific Server with the monitoring information obtained in Step 161 or 162 and/or 163 (that is, feeding back a service monitoring response or notifying Service monitoring response/notification). If step 164 does not include the V2X user ID or V2X UE ID, the VAE Server responds network monitoring information not related to a single V2X UE. If step 164 includes the V2X user ID or V2X UE ID, but does not include the V2X Service ID, then the VAE Server responds the monitoring information of all services of the corresponding V2X UE. If step 164 includes the V2X user ID but does not include the V2X UE ID, the VAE Server determines the VAE Client ID and VAE UE ID associated with the user ID.

The V2X Application Specific Server performs corresponding data processing according to the obtained monitoring information data and local service configuration information, matches the V2V communication mode and generates decision information. The V2X Application Specific Server sends a communication mode request to the VAE Server, and the message contains the V2X user ID or V2X UE ID, V2X Service ID, and the corresponding V2V communication mode decision.

Step 166: The VAE Server sends a communication mode subscription to the V2X Application Specific Server; the message includes the V2X user ID or V2X UE ID, and the V2X Service ID.

Step 167: The V2X Application Specific Server feeds back a communication mode notification to the VAE Server; the message includes the V2X user ID or V2X UE ID, V2X Service ID, and the corresponding V2V communication mode decision.

Step 168: The VAE Server sends a network monitoring information notification to the VAE Client;

Specifically, this step reuses the network monitoring information notification in the existing message (including the communication mode decision information obtained in step 167, the same as steps 157 and 158 in Example 3A).

Step 169: (Optional) Performing Communication mode change.

Relevant content in this example and example 3A can refer to each other, and will not be repeated here.

Regarding Example 3, related content with Example 1 may refer to each other, and will not be repeated here.

As can be seen from the above, the solutions provided in the embodiments of the present disclosure mainly involve:

(1) The VAE Server obtains the application layer interaction of the V2V communication mode status information of the V2X UE;

(2) VAE Server directly or indirectly participates in the application layer interaction of V2V communication mode decision-making and switching.

The solution provided by the embodiment of present disclosure adds the application layer V2X service requirements to participate in the decision-making of mode selection of V2V communication, which is more comprehensive than the previous consideration of the status of the communication network itself, and can be adapted according to the actual traffic geographical environment and transmission environment scenarios; and compared with the self-decision of a single UE, it is more conducive to maintaining the performance and stability of the overall service quality of V2X, and reducing the risk of local service and network congestion.

In summary, this solution not only considers the network status, but also considers the impact of the service quality of the V2X service high-layer, the temporal and spatial changes of traffic information on the decision-making of the communication mode; it avoids that the information processing scheme for the switching of the V2X communication mode will reduce performance and stability of the overall V2X service Quality, avoids problems caused by local service and network congestion.

Figure 17:
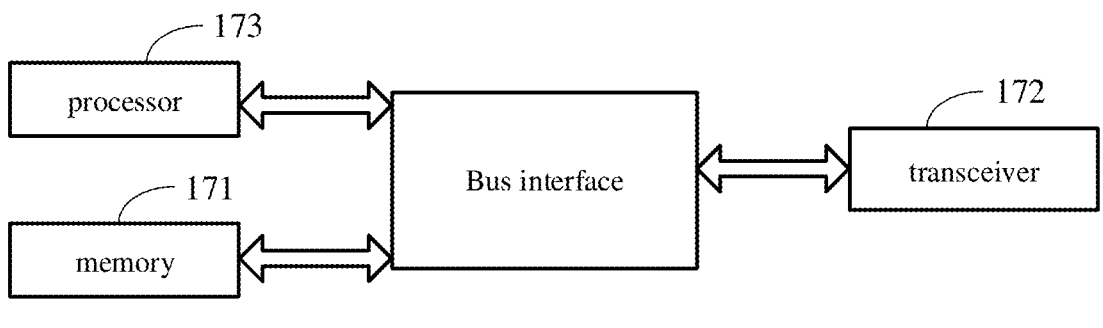
FIG. 17 is a schematic diagram of a first structure of a server according to an embodiment of the present disclosure.

The embodiment of the present disclosure also provides a server. The server is a first server. As shown in FIG. 17, the server includes a memory 171, a transceiver 172, and a processor 173.

The memory 171 is used to store computer programs; the transceiver 172 is used to send and receive data under the control of the processor 173; the processor 173 is used to read the computer programs in the memory 171 and perform the following operations:

Receiving, by the transceiver 172, first pre-configured information sent by a second server;

Obtaining communication mode decision information according to the first pre-configured information;

Sending, by the transceiver 172, the communication mode decision information to corresponding V2X UEs;

Wherein, the first pre-configured information includes at least one of the following information:

Service configuration information for at least two V2X UEs;

Communication mode decision information for the at least two V2X UEs;

There is a correlation between the communication mode decision information and V2X service.

The server provided in the embodiment of the present disclosure receives the first pre-configured information sent by the second server; obtains communication mode decision information according to the first pre-configured information; and sends the communication mode decision information to the corresponding V2X UEs; wherein, the first pre-configured information includes at least one of the following information: service configuration information for at least two V2X UEs; communication mode decision information for the at least two V2X UEs; a correlation between the communication mode decision information and V2X service. Therefore, the network side can determine the decision on the communication mode, and then the decision on the communication mode can not only consider the network status, but also consider the impact of service quality of the V2X high layer, the temporal and spatial changes in traffic information on communication mode decision; thereby avoiding the switching between communication modes of V2V communication is determined by UE alone, which may reduce the performance and stability of V2X overall service quality, and cause local service and network congestion, which solves the problem in the related art that the information processing scheme for switching V2X communication modes will reduce the performance and stability of the overall service quality of V2X, and cause local service and network congestion.

Specifically, the transceiver 172 is configured to receive and send data under the control of the processor 173.

Wherein, in FIG. 17, the bus architecture may include any number of interconnected buses and bridges, specifically various circuits of one or more processors represented by the processor 173 and the memory represented by the memory 171 are linked together. The bus architecture can also link together various other circuits such as peripherals, voltage regulators, and power management circuits, etc., which are well known in the art and therefore will not be further described herein. The bus interface provides the interface. Transceiver 172 may be a plurality of elements, including a transmitter and a receiver, providing a unit for communicating with various other devices over transmission medium, including wireless channels, wired channels, fiber optic cables, and other transmission medium. The processor 173 is responsible for managing the bus architecture and general processing, and the memory 171 can store data used by the processor 173 when performing operations.

The processor 173 may be a central processing unit (CPU), an application specific integrated circuit (ASIC), a field programmable gate array (FPGA) or a complex programmable logic device (CPLD), the processor can also adopt a multi-core architecture.

Wherein, in the case that the first pre-configured information includes service configuration information, the obtaining communication mode decision information according to the first pre-configured information includes: obtaining network monitoring information for the at least two V2X UEs and/or current communication status information of each of the V2X UEs; and obtaining the communication mode decision information according to the network monitoring information and/or communication status information, and service configuration information.

Specifically, the obtaining the communication mode decision information according to the network monitoring information and/or communication status information, and service configuration information includes: obtaining real-time information of pre-configured parameters according to the network monitoring information for at least two Internet of Vehicle UEs and/or the current communication status information of each of the V2X UE; obtaining the communication mode decision information according to the real-time information and the service configuration information; wherein the pre-configured parameters include at least one of the following parameters: a density of V2X UEs within a geographical area where the V2X UEs are located; a transmission environment scenario where the V2X UEs are located; a service experience quality of the V2X UEs; a location area where the V2X UEs are located.

In the embodiment of the present disclosure, the receiving the first pre-configured information sent by the second server includes: sending, by the transceiver 172, the first request information to the second server; receiving, by the transceiver 172, a first response information fed back by the second server according to the first request information, the first response information carrying the first pre-configured information; or, sending, by the transceiver 172, first subscription information to the second server; receiving, by the transceiver 172, first notification information fed back by the second server according to the first subscription information, the first notification information carrying the first pre-configured information.

In this embodiment of the present disclosure, when the first pre-configured information includes communication mode decision information, before receiving the first pre-configured information sent by the second server, the method further includes: obtaining network monitoring information for the at least two V2X UEs and/or current communication status information of each of the V2X UEs; sending, by the transceiver 172, the network monitoring information and/or the communication status information to the second server; or processing the network monitoring information, obtaining communication mode decision reference information; sending, by the transceiver 172, the communication mode decision reference information and/or communication status information to the second server.

Wherein, the communication status information includes at least one of the following information: vehicle-to-vehicle communication mode information; identity information of a peer UE of vehicle-to-vehicle communication; service quality information; an identifier of the V2X UE; speed information of the V2X UE; service identification information.

Specifically, the vehicle-to-vehicle communication mode information includes: LTE Uu communication of interface between a long term evolved base station and a UE, ProSe direct communication interface 5 (PC5) communication mode, the NR Uu communication of the interface between a new radio interface base station and the UE and PC5 communication mode, LTE Uu communication mode or NR Uu communication mode; and/or, the identity information of the peer UE of the vehicle-to-vehicle communication includes: client identification information corresponding to a peer V2X UE, the identification information of the peer V2X UE and/or identification information of a peer V2X user; and/or, the quality of service information includes: end-toend service delay information and/or data packet loss rate information of the V2X UE; and/or, the identifier of the V2X UE includes: client identification information corresponding to the V2X UE, identification information of the V2X UE, and/or identification information of an V2X user.

Wherein, the obtaining the current communication status information of each of the V2X UEs includes: sending, by the transceiver 172, second request information to the V2X UE; receiving, by the transceiver 172, second response information fed back by the V2X UE according to the second request information; wherein the second response information carries the communication status information; or, sending, by the transceiver 172, second subscription information to the V2X UE; receiving, by the transceiver 172, second notification information fed back by the V2X UE according to the second subscription information; wherein the second notification information carries the communication status information.

In the embodiment of the present disclosure, the obtaining the network monitoring information for the at least two V2X UEs includes: interacting with a core network to obtain the network monitoring information.

Further, after obtaining the network monitoring information for the at least two V2X UEs and/or the current communication status information of each of the V2X UEs, the method further includes: sending, by the transceiver 172, third request information to the second server; wherein the third request information carries the second pre-configured information and the communication status information; the receiving the first pre-configured information sent by the second server includes: receiving, by the transceiver 172, third response information fed back by the second server according to the third request information, wherein the third response information carries the first pre-configured information; or, sending, by the transceiver 172, third subscription information to the second server; wherein the third subscription information carries the second pre-configured information and the communication status information; the receiving the first pre-configured information sent by the second server includes: receiving, by the transceiver 172, third notification information fed back by the second server according to the third subscription information, wherein the third notification information carries the first pre-configured information; the second pre-configured information includes any one of the following information: network monitoring information for the at least two V2X UEs; communication mode decision reference information.

In the embodiment of the present disclosure, the sending the communication mode decision information to each corresponding V2X UE includes: sending, by the transceiver 172, fourth request information to the V2X UE, wherein the fourth request information carries the communication mode decision information; or, sending, by the transceiver 172, network monitoring information notification to the V2X UE, wherein the network monitoring information notification carries the communication mode decision information.

Further, after sending the fourth request information to the V2X UE, the operation further includes: receiving, by the transceiver 172, fourth response information fed back by the V2X UE according to the fourth request information.

Wherein, the operation further includes: after receiving the fourth response information fed back by V2X UE according to the fourth request information, sending, by the transceiver 172, the fourth response information to the second server.

In this embodiment of the present disclosure, the fourth response information carries communication mode execution decision information and/or service identifier association update information; or, the fourth response information carries communication mode execution result information and/or service identifier association update information.

Specifically, the communication mode execution decision information includes at least one of the following execution decision information: executing to establish a target communication mode; executing to cancel a target communication mode; executing to determine and establish a target communication mode according to communication mode reference information.

In the embodiment of the present disclosure, the communication mode decision information carries any one of the following information: target communication mode establishment indication information; target communication mode cancellation indication information; communication mode information; communication mode reference information.

In the embodiment of the present disclosure, the target communication mode includes any one of the following modes: only the ProSe direct communication interface PC5 communication mode; PC5 communication and the LTE Uu communication mode of the interface between the long-term evolution base station and the UE; PC5 communication and the NR Uu communication mode of interface between the NR base station and UE; only LTE Uu communication mode; only NR Uu communication mode.

Wherein, the communication mode reference information includes the correlation between the communication mode and at least one of the following information: network monitoring information for the V2X UE; communication status information of the V2X UE; service configuration information.

Specifically, the network monitoring information includes: congestion level information, overload level information, location area information and/or effective time zone information; and/or, the service configuration information includes service configuration identification information, or service configuration index information.

In this embodiment of the present disclosure, the service configuration information includes: communication mode information, third pre-configured information, and service configuration identification information or service configuration index information; wherein, the third pre-configured information includes at least one of the following information: transmission environment scenario information; location area information; density information; speed information; congestion level information; overload level information; service identification information.

It should be noted here that the server provided by the embodiment of the present disclosure can implement all the method steps implemented by the above-mentioned method at the first server side, and can achieve the same technical effect. The same parts and beneficial effects of the method embodiments are not repeated herein.

Figure 18:
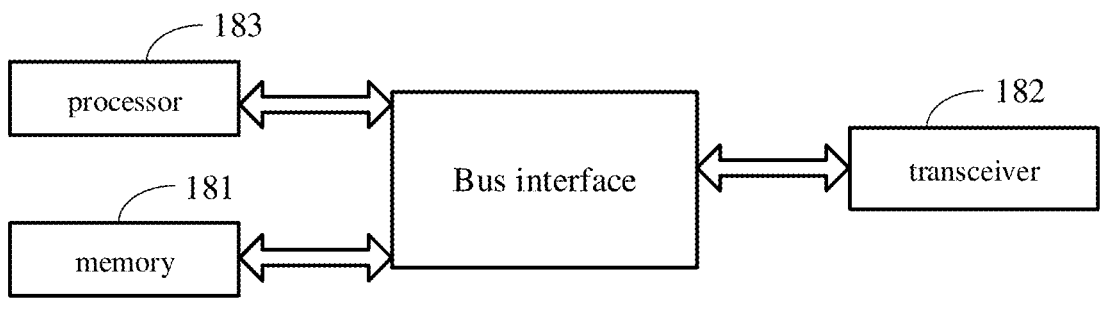
FIG. 18 is a schematic diagram of a second structure of a server according to an embodiment of the present disclosure.

The embodiment of the present disclosure also provides a server. The server is a second server. As shown in FIG. 18, the server includes a memory 181, a transceiver 182, and a processor 183.

The memory 181 is used to store computer programs; the transceiver 182 is used to send and receive data under the control of the processor 183; the processor 183 is used to read the computer programs in the memory 181 and perform the following operations:

Sending, by the transceiver 182, first pre-configured information to a first server;

Wherein, the first pre-configured information includes at least one of the following information:

Service configuration information for at least two V2X UEs;

Communication mode decision information for the at least two V2X UEs.

The server provided in the embodiment of the present disclosure sends the first pre-configured information to the first server; wherein, the first pre-configured information includes at least one of the following information: service configuration information for at least two V2X UEs; communication mode decision information for the at least two V2X UEs. Therefore, the network side can determine the decision on the communication mode, and then the decision on the communication mode can not only consider the network status, but also consider the impact of service quality of the V2X high layer, the temporal and spatial changes in traffic information on communication mode decision; thereby avoiding the switching between communication modes of V2V communication is determined by UE alone, which may reduce the performance and stability of V2X overall service quality, and cause local service and network congestion, which solves the problem in the related art that the information processing scheme for switching V2X communication modes will reduce the performance and stability of the overall service quality of V2X, and cause local service and network congestion.

The transceiver 182 is used for receiving and sending data under the control of the processor 183.

Wherein, in FIG. 18, the bus architecture may include any number of interconnected buses and bridges, specifically various circuits of one or more processors represented by the processor 183 and the memory represented by the memory 181 are linked together. The bus architecture can also link together various other circuits such as peripherals, voltage regulators, and power management circuits, etc., which are well known in the art and therefore will not be further described herein. The bus interface provides the interface. Transceiver 182 may be a plurality of elements, including a transmitter and a receiver, providing a unit for communicating with various other devices over transmission medium, including wireless channels, wired channels, fiber optic cables, and other transmission media. The processor 183 is responsible for managing the bus architecture and general processing, and the memory 181 can store data used by the processor 183 when performing operations.

The processor 183 may be a central processing unit (CPU), an application specific integrated circuit (ASIC), a field programmable gate array (FPGA) or a complex programmable logic device (CPLD), the processor can also adopt a multi-core architecture.

Wherein, when the first pre-configured information includes communication mode decision information, before sending the first pre-configured information to the first server, further includes: receiving, by the transceiver 182, the second pre-configured information sent by the first server and current communication status information of each of the V2X UEs; obtaining communication mode decision information according to the second pre-configured information and/or communication status information, and service configuration information; wherein, the second pre-configured information includes any one of the following information: network monitoring information for the at least two V2X UEs; communication mode decision reference information.

Specifically, the obtaining communication mode decision information according to the second pre-configured information and/or communication status information and service configuration information includes: obtaining real time information of pre-configured parameters according to the second pre-configured information and/or communication status information; obtaining communication mode decision information according to the real time information and the service configuration information; wherein the pre-configured parameters include at least one of the following parameters: a density of V2X UEs within a geographical area where the V2X UEs are located; a transmission environment scenario where the V2X UEs are located; a service experience quality of the V2X UEs; a location area where the V2X UEs are located.

Wherein, the communication status information includes at least one of the following information: vehicle-to-vehicle communication mode information; identity information of the vehicle-to-vehicle communication peer UE; service quality information; an identifier of the V2X UE; speed information of the V2X UE; service identification information.

Specifically, the vehicle-to-vehicle communication mode information includes: LTE Uu communication of interface between a long term evolved base station and a UE, ProSe direct communication interface 5 (PC5) communication mode, the NR Uu communication of the interface between a new radio interface base station and the UE and PC5 communication mode, LTE Uu communication mode or NR Uu communication mode; and/or, the identity information of the peer UE of the vehicle-to-vehicle communication includes: client identification information corresponding to a peer V2X UE, the identification information of the peer V2X UE and/or identification information of a peer V2X user; and/or, the quality of service information includes: end-to-end service delay information and/or data packet loss rate information of the V2X UE; and/or, the identifier of the V2X UE includes: client identification information corresponding to the V2X UE, identification information of the V2X UE, and/or identification information of an V2X user.

In the embodiment of the present disclosure, the receiving the second pre-configured information sent by the first server and the current communication status information of each of V2X UEs includes: receiving, by the transceiver 182, third request information sent by the first server; wherein the third request information carries the second pre-configured information and the communication status information; the sending the first pre-configured information to the first server includes: feeding back, by the transceiver 182, the third response information to the first server according to the third request information, wherein the third response information carries the first pre-configured information; or receiving, by the transceiver 182, third subscription information sent by the first server; wherein the third subscription information carries the second pre-configured information and the communication status information; the sending the first pre-configured information to the first server includes: feeding back, by the transceiver 182, third notification information to the first server according to the third subscription information, wherein the third notification information carries the first pre-configured information.

Wherein, when the first pre-configured information includes service configuration information, sending the first pre-configured information to the first server includes: receiving, by the transceiver 182, first request information sent by the first server, feeding back, by the transceiver 182, first response information to the first server according to the first request information, wherein the first response information carries the first pre-configured information; or receiving, by the transceiver 182, the first subscription information sent by the first server; feeding back, by the transceiver 182, first notification information to the first server according to the first subscription information, wherein the first notification information carries the first pre-configured information.

Further, the operation further includes: after sending the first pre-configured information to the first server, receiving, by the transceiver 182, fourth response information sent by the first server.

Wherein, the fourth response information carries communication mode execution decision information and/or service identifier association update information; or, the fourth response information carries communication mode execution result information and/or service identifier association update information.

Specifically, the communication mode decision information carries any one of the following information: target communication mode establishment indication information; target communication mode cancellation indication information; communication mode information; communication mode reference information.

In the embodiment of the present disclosure, the target communication mode includes any one of the following modes: only the ProSe direct communication interface PC5 communication mode; PC5 communication and the LTE Uu communication mode of the interface between the long-term evolution base station and the UE; PC5 communication and the NR Uu communication mode of interface between the NR base station and UE; only LTE Uu communication mode; only NR Uu communication mode.

In the embodiment of the present disclosure, the communication mode reference information includes a correlation between the communication mode and at least one of the following information: network monitoring information for the V2X UE; communication status information of the V2X UE; service configuration information.

Wherein, the network monitoring information includes: congestion level information, overload level information, location area information and/or effective time zone information; and/or, the service configuration information includes service configuration identification information, or service configuration index information.

In this embodiment of the present disclosure, the service configuration information includes: communication mode information, third pre-configured information, and service configuration identification information or service configuration index information; wherein, the third pre-configured information includes at least one of the following information: transmission environment scenario information; location area information; density information; speed information; congestion level information; overload level information; service identification information.

It should be noted here that the above-mentioned server provided by the embodiment of the present disclosure can implement all the method steps implemented by the above-mentioned method in the second server side, and can achieve the same technical effect. The same parts and beneficial effects of the method embodiments are not repeated herein.

Figure 19:
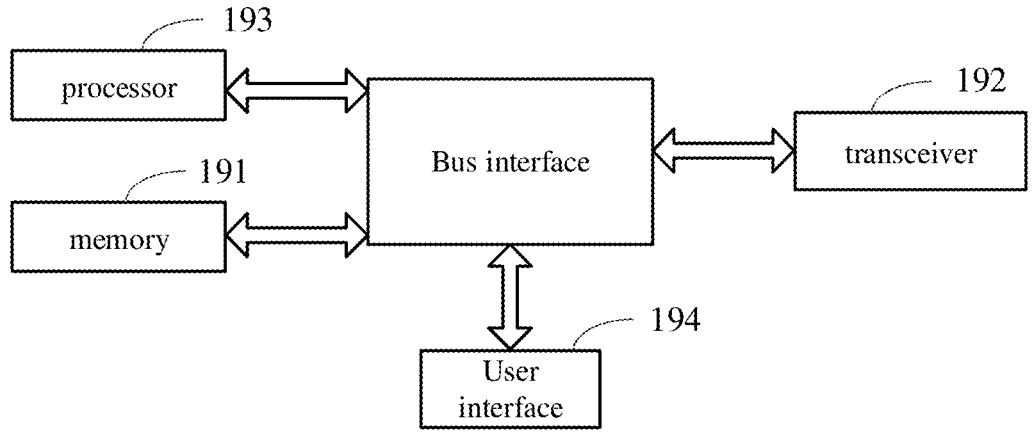
FIG. 19 is a schematic structural diagram of a VOI UE according to an embodiment of the present disclosure.

The embodiment of the present disclosure also provides a V2X UE, as shown in FIG. 19, including a memory 191, a transceiver 192, and a processor 193.

The memory 191 is used to store computer programs; the transceiver 192 is used to send and receive data under the control of the processor 193; the processor 193 is used to read the computer programs in the memory 191 and perform the following operations:

Receiving, by the transceiver 192, communication mode decision information sent by a first server;

Wherein, the communication mode decision information is obtained according to network monitoring information and/or current communication status information of the V2X UE, and service configuration information;

There is a correlation between the communication mode decision information and V2X service.

The V2X UE provided in the embodiment of the present disclosure receives communication mode decision information sent by the first server; wherein, the communication mode decision information is obtained based on network monitoring information and/or current communication status information of V2X UE, and service configuration information; there is a correlation between the communication mode decision information and V2X service. Therefore, the network side can determine the decision on the communication mode, and then the decision on the communication mode can not only consider the network status, but also consider the impact of service quality of the V2X high layer, the temporal and spatial changes in traffic information on communication mode decision; thereby avoiding the switching between communication modes of V2V communication is determined by UE alone, which may reduce the performance and stability of V2X overall service quality, and cause local service and network congestion, which solves the problem in the related art that the information processing scheme for switching V2X communication modes will reduce the performance and stability of the overall service quality of V2X, and cause local service and network congestion.

Specifically, the transceiver 192 is configured to receive and send data under the control of the processor 193.

Wherein, in FIG. 19, the bus architecture may include any number of interconnected buses and bridges, specifically various circuits of one or more processors represented by the processor 193 and the memory represented by the memory 191 are linked together. The bus architecture can also link together various other circuits such as peripherals, voltage regulators, and power management circuits, etc., which are well known in the art and therefore will not be further described herein. The bus interface provides the interface. Transceiver 192 may be a plurality of elements, including a transmitter and a receiver, providing a unit for communicating with various other devices over transmission medium, including wireless channels, wired channels, fiber optic cables, etc. For different UEs, the user interface 194 may also be an interface capable of connecting externally and internally to required equipment, and the connected equipment includes but not limited to a keypad, a display, a speaker, a microphone, a joystick, and the like.

The processor 193 is responsible for managing the bus architecture and general processing, and the memory 191 can store data used by the processor 193 when performing operations.

Optionally, the processor 193 may be a CPU, ASIC, FPGA or CPLD, and the processor can also adopt a multi-core architecture.

The processor is used to execute any one of the methods provided in the embodiments of the present disclosure according to the obtained executable instructions by calling the computer program stored in the memory. The processor and memory may also be physically separated.

Wherein, the communication mode decision information carries at least one of the following information: target communication mode establishment indication information;

target communication mode cancellation indication information; communication mode information; communication mode reference information.

Specifically, the target communication mode includes any one of the following modes: only the ProSe direct communication interface PC5 communication mode; PC5 communication and the LTE Uu communication mode of the interface between the long-term evolution base station and the UE; PC5 communication and the NR Uu communication mode of interface between the NR base station and UE; only LTE Uu communication mode; only NR Uu communication mode.

In the embodiment of the present disclosure, the communication mode reference information includes the correlation between the communication mode and at least one of the following information: network monitoring information for the V2X UE; communication status information of the V2X UE; service configuration information.

Wherein, the network monitoring information includes: congestion level information, overload level information, location area information and/or effective time zone information; and/or, the service configuration information includes service configuration identification information, or service configuration index information.

Specifically, the communication status information includes at least one of the following information: vehicle-to-vehicle communication mode information; identity information of the vehicle-to-vehicle communication peer UE; service quality information; an identifier of the V2X UE; speed information of the V2X UE; service identification information.

In the embodiment of the present disclosure, the vehicle-to-vehicle communication mode information includes: the communication mode of the LTE Uu communication interface between the long-term evolution base station and the UE, the communication mode of the PC5 communication interface of the proximity service direct communication interface, the NR Uu communication mode of the interface between the new air interface base station and the UE, and the PC5 communication mode, LTE Uu communication mode or NR Uu communication mode; and/or, the identity information of the vehicle-to-vehicle communication opposite site UE includes: the client identification information corresponding to the vehicle network UE of the opposite end, the identification information of the V2X UE of the opposite end and/or the UE identification information of the opposite end V2X user identification information; and/or, the quality of service information includes: end-to-end service delay information and/or data packet loss rate information of V2X UE; and/or, the identification of V2X UE Including: the client identification information corresponding to the vehicle network UE, the vehicle network UE identification information and/or the vehicle network user identification information.

Further, the operation further includes: before receiving the communication mode decision information sent by the first server, receiving, by the transceiver 192, second request information sent by the first server; feeding back, by the transceiver 192, second response information to the first server according to the second request information; wherein the second response information carries the communication status information; or, receiving, by the transceiver 192, the second subscription information sent by the first server; feeding back, by the transceiver 192, second notification information to the first server information according to the second subscription information; wherein the second notification information carries the communication status information.

Wherein, the operation further includes: after receiving the communication mode decision information sent by the first server, the method further includes: determining communication mode execution decision information according to the communication mode decision information; wherein, the communication mode execution decision information includes at least one of the following execution decision information: executing to establish a target communication mode; executing to cancel the target communication mode; executing to determine and establish the target communication mode according to the communication mode reference information.

Further, the operation further includes: after determining the communication mode execution decision information according to the communication mode decision information, the method further includes: associating the target communication mode with a current related service identifier for a target communication mode that is determined to establish, to obtain service identifier association update information; and/or, de-associating the target communication mode from the current related service identifier for the target communication mode that is determined to be canceled, to obtain service identifier association update information.

In the embodiment of the present disclosure, the operation further includes: after determining the communication mode execution decision information according to the communication mode decision information, performing decision information according to the communication mode, performing corresponding operations on the communication mode, obtaining communication mode execution result information.

Wherein, the receiving the communication mode decision information sent by the first server includes: receiving, by the transceiver 192, fourth request information sent by the first server, wherein the fourth request information carries the communication mode decision information; or, receiving, by the transceiver 192, network monitoring information notification sent by the first server, wherein the network monitoring information notification carries the communication mode decision information.

In the embodiment of the present disclosure, the operation further includes: after receiving the fourth request information sent by the first server, feeding back, by the transceiver 192, fourth response information to the first server according to the fourth request information.

Wherein, the fourth response information carries communication mode execution decision information and/or service identifier association update information; or, the fourth response information carries communication mode execution result information and/or service identifier association update information.

Specifically, the service configuration information includes: communication mode information, third pre-configured information, and service configuration identification information or service configuration index information; wherein, the third pre-configured information includes at least one of the following information: transmission environment scenario information; location area information; density information; speed information; congestion level information; overload level information; service identification information.

What needs to be explained here is that the above-mentioned V2X UE provided by the embodiment of the present disclosure can realize all the method steps realized by the above-mentioned method embodiment on V2X UE side, and can achieve the same technical effect. The same parts and beneficial effects as those in the method embodiment will not be repeated herein.

Figure 20:
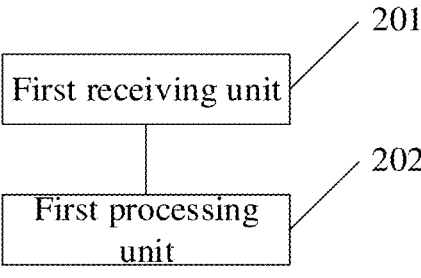
FIG. 20 is a schematic diagram of a first structure of the information processing device according to the embodiment of the present disclosure.

The embodiment of the present disclosure also provides an information processing device, which is applied to the first server, as shown in FIG. 20, including:

a first receiving unit 201 is configured to receive first pre-configured information sent by a second server;

a first processing unit 202 is configured to obtain communication mode decision information according to the first pre-configured information;

Send the communication mode decision information to corresponding V2X UEs;

Wherein, the first pre-configured information includes at least one of the following information:

Service configuration information for at least two V2X UEs;

Communication mode decision information for the at least two V2X UEs;

There is a correlation between the communication mode decision information and V2X service.

The information processing device provided in the embodiment of the present disclosure receives the first pre-configured information sent by the second server; obtains communication mode decision information according to the first pre-configured information; and sends the communication mode decision information to the corresponding V2X UEs; wherein, the first pre-configured information includes at least one of the following information: service configuration information for at least two V2X UEs; communication mode decision information for the at least two V2X UEs; a correlation between the communication mode decision information and V2X service. Therefore, the network side can determine the decision on the communication mode, and then the decision on the communication mode can not only consider the network status, but also consider the impact of service quality of the V2X high layer, the temporal and spatial changes in traffic information on communication mode decision; thereby avoiding the switching between communication modes of V2V communication is determined by UE alone, which may reduce the performance and stability of V2X overall service quality, and cause local service and network congestion, which solves the problem in the related art that the information processing scheme for switching V2X communication modes will reduce the performance and stability of the overall service quality of V2X, and cause local service and network congestion.

Wherein, in the case that the first pre-configured information includes service configuration information, the obtaining communication mode decision information according to the first pre-configured information includes: obtaining network monitoring information for the at least two V2X UEs and/or current communication status information of each of the V2X UEs; and obtaining the communication mode decision information according to the network monitoring information and/or communication status information, and service configuration information.

Specifically, the obtaining the communication mode decision information according to the network monitoring information and/or communication status information, and service configuration information includes: obtaining real-time information of pre-configured parameters according to the network monitoring information for at least two Internet of Vehicle UEs and/or the current communication status information of each of the V2X UE; obtaining the communication mode decision information according to the real-time information and the service configuration information; wherein the pre-configured parameters include at least one of the following parameters: a density of V2X UEs within a geographical area where the V2X UEs are located; a transmission environment scenario where the V2X UEs are located; a service experience quality of the V2X UEs; a location area where the V2X UEs are located.

In the embodiment of the present disclosure, the receiving the first pre-configured information sent by the second server includes: sending the first request information to the second server; receiving a first response information fed back by the second server according to the first request information, the first response information carrying the first pre-configured information; or, sending first subscription information to the second server; receiving first notification information fed back by the second server according to the first subscription information, the first notification information carrying the first pre-configured information.

In this embodiment of the present disclosure, when the first pre-configured information includes communication mode decision information, further includes a first obtaining unit, configured to, before receiving the first pre-configured information sent by the second server, obtain network monitoring information for the at least two V2X UEs and/or current communication status information of each of the V2X UEs; a first sending unit, configured to send the network monitoring information and/or the communication status information to the second server; or a second processing unit, configured to process the network monitoring information before receiving the first present information sent by the second server, obtain communication mode decision reference information; a second sending unit, configured to sent the communication mode decision reference information and/or communication status information to the second server.

Wherein, the communication status information includes at least one of the following information: vehicle-to-vehicle communication mode information; identity information of a peer UE of vehicle-to-vehicle communication; service quality information; an identifier of the V2X UE; speed information of the V2X UE; service identification information.

Specifically, the vehicle-to-vehicle communication mode information includes: LTE Uu communication of interface between a long term evolved base station and a UE, ProSe direct communication interface 5 (PC5) communication mode, the NR Uu communication of the interface between a new radio interface base station and the UE and PC5 communication mode, LTE Uu communication mode or NR Uu communication mode; and/or, the identity information of the peer UE of the vehicle-to-vehicle communication includes: client identification information corresponding to a peer V2X UE, the identification information of the peer V2X UE and/or identification information of a peer V2X user; and/or, the quality of service information includes: end-to-end service delay information and/or data packet loss rate information of the V2X UE; and/or, the identifier of the V2X UE includes: client identification information corresponding to the V2X UE, identification information of the V2X UE, and/or identification information of an V2X user.

Wherein, the obtaining the current communication status information of each of the V2X UEs includes: sending second request information to the V2X UE; receiving second response information fed back by the V2X UE according to the second request information; wherein the second response information carries the communication status information; or, sending second subscription information to the V2X UE; receiving second notification information fed back by the V2X UE according to the second subscription information; wherein the second notification information carries the communication status information.

In the embodiment of the present disclosure, the obtaining the network monitoring information for the at least two V2X UEs includes: interacting with a core network to obtain the network monitoring information.

Further, the information processing device further includes a third sending unit, configured to, after obtaining the network monitoring information for the at least two V2X UEs and/or the current communication status information of each of the V2X UEs, send third request information to the second server; wherein the third request information carries the second pre-configured information and the communication status information; the receiving the first pre-configured information sent by the second server includes: receiving third response information fed back by the second server according to the third request information, wherein the third response information carries the first pre-configured information; or, sending third subscription information to the second server; wherein the third subscription information carries the second pre-configured information and the communication status information; the receiving the first pre-configured information sent by the second server includes: receiving third notification information fed back by the second server according to the third subscription information, wherein the third notification information carries the first pre-configured information; the second pre-configured information includes any one of the following information: network monitoring information for the at least two V2X UEs; communication mode decision reference information.

In the embodiment of the present disclosure, the sending the communication mode decision information to each corresponding V2X UE includes: sending fourth request information to the V2X UE, wherein the fourth request information carries the communication mode decision information; or, sending network monitoring information notification to the V2X UE, wherein the network monitoring information notification carries the communication mode decision information.

Further, the information processing device further includes: a second receiving unit, configured to, after sending the fourth request information to the V2X UE, receive fourth response information fed back by the V2X UE according to the fourth request information.

Furthermore, the information processing device further includes: a fourth sending unit, configured to, after receiving fourth response information fed back by the V2X UE according to the fourth request information, send the fourth response information to the second server.

In this embodiment of the present disclosure, the fourth response information carries communication mode execution decision information and/or service identifier association update information; or, the fourth response information carries communication mode execution result information and/or service identifier association update information.

Specifically, the communication mode execution decision information includes at least one of the following execution decision information: executing to establish a target communication mode; executing to cancel a target communication mode; executing to determine and establish a target communication mode according to communication mode reference information.

In the embodiment of the present disclosure, the communication mode decision information carries any one of the following information: target communication mode establishment indication information; target communication mode cancellation indication information; communication mode information; communication mode reference information.

In the embodiment of the present disclosure, the target communication mode includes any one of the following modes: only the ProSe direct communication interface PC5 communication mode; PC5 communication and the LTE Uu communication mode of the interface between the long-term evolution base station and the UE; PC5 communication and the NR Uu communication mode of interface between the NR base station and UE; only LTE Uu communication mode; only NR Uu communication mode.

Wherein, the communication mode reference information includes the correlation between the communication mode and at least one of the following information: network monitoring information for the V2X UE; communication status information of the V2X UE; service configuration information.

Specifically, the network monitoring information includes: congestion level information, overload level information, location area information and/or effective time zone information; and/or, the service configuration information includes service configuration identification information, or service configuration index information.

In this embodiment of the present disclosure, the service configuration information includes: communication mode information, third pre-configured information, and service configuration identification information or service configuration index information; wherein, the third pre-configured information includes at least one of the following information: transmission environment scenario information; location area information; density information; speed information; congestion level information; overload level information; service identification information.

It should be noted here that the above-mentioned device provided by the embodiment of the present disclosure can realize all the method steps realized by the above-mentioned method embodiment at the first server side, and can achieve the same technical effect. The same parts and beneficial effects of the method embodiments are not repeated herein.

Figure 21:
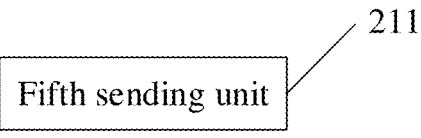
FIG. 21 is a schematic diagram of a second structure of the information processing device according to the embodiment of the present disclosure.

The embodiment of the present disclosure also provides an information processing device, which is applied to a second server, as shown in FIG. 21, including:

a fifth sending unit 211 is configured to send first pre-configured information to a first server;

Wherein, the first pre-configured information includes at least one of the following information:

Service configuration information for at least two V2X UEs;

Communication mode decision information for the at least two V2X UEs.

The information processing device provided in the embodiment of the present disclosure sends the first pre-configured information to the first server; wherein, the first pre-configured information includes at least one of the following information: service configuration information for at least two V2X UEs; communication mode decision information for the at least two V2X UEs. Therefore, the network side can determine the decision on the communication mode, and then the decision on the communication mode can not only consider the network status, but also consider the impact of service quality of the V2X high layer, the temporal and spatial changes in traffic information on communication mode decision; thereby avoiding the switching between communication modes of V2V communication is determined by UE alone, which may reduce the performance and stability of V2X overall service quality, and cause local service and network congestion, which solves the problem in the related art that the information processing scheme for switching V2X communication modes will reduce the performance and stability of the overall service quality of V2X, and cause local service and network congestion.

Wherein, when the first pre-configured information includes communication mode decision information, it further includes: a third receiving unit, configured to, before sending the first pre-configured information to the first server, receive the second pre-configured information sent by the first server and current communication status information of each of the V2X UEs; a third processing unit, configured to obtain communication mode decision information according to the second pre-configured information and/or communication status information, and service configuration information; wherein, the second pre-configured information includes any one of the following information: network monitoring information for the at least two V2X UEs; communication mode decision reference information.

Specifically, the obtaining communication mode decision information according to the second pre-configured information and/or communication status information and service configuration information includes: obtaining real time information of pre-configured parameters according to the second pre-configured information and/or communication status information; obtaining communication mode decision information according to the real time information and the service configuration information; wherein the pre-configured parameters include at least one of the following parameters: a density of V2X UEs within a geographical area where the V2X UEs are located; a transmission environment scenario where the V2X UEs are located; a service experience quality of the V2X UEs; a location area where the V2X UEs are located.

Wherein, the communication status information includes at least one of the following information: vehicle-to-vehicle communication mode information; identity information of the vehicle-to-vehicle communication peer UE; service quality information; an identifier of the V2X UE; speed information of the V2X UE; service identification information.

Specifically, the vehicle-to-vehicle communication mode information includes: LTE Uu communication of interface between a long term evolved base station and a UE, ProSe direct communication interface 5 (PC5) communication mode, the NR Uu communication of the interface between a new radio interface base station and the UE and PC5 communication mode, LTE Uu communication mode or NR Uu communication mode; and/or, the identity information of the peer UE of the vehicle-to-vehicle communication includes: client identification information corresponding to a peer V2X UE, the identification information of the peer V2X UE and/or identification information of a peer V2X user; and/or, the quality of service information includes: end-to-end service delay information and/or data packet loss rate information of the V2X UE; and/or, the identifier of the V2X UE includes: client identification information corresponding to the V2X UE, identification information of the V2X UE, and/or identification information of an V2X user.

In the embodiment of the present disclosure, the receiving the second pre-configured information sent by the first server and the current communication status information of each of V2X UEs includes: receiving third request information sent by the first server; wherein the third request information carries the second pre-configured information and the communication status information; the sending the first pre-configured information to the first server includes: feeding back the third response information to the first server according to the third request information, wherein the third response information carries the first pre-configured information; or receiving third subscription information sent by the first server; wherein the third subscription information carries the second pre-configured information and the communication status information; the sending the first pre-configured information to the first server includes: feeding back third notification information to the first server according to the third subscription information, wherein the third notification information carries the first pre-configured information.

Wherein, when the first pre-configured information includes service configuration information, sending the first pre-configured information to the first server includes: receiving first request information sent by the first server, feeding back first response information to the first server according to the first request information, wherein the first response information carries the first pre-configured information; or receiving the first subscription information sent by the first server; feeding back first notification information to the first server according to the first subscription information, wherein the first notification information carries the first pre-configured information.

Further, the information processing device further includes: a fourth receiving unit, configured to, after sending the first pre-configured information to the first server, receive fourth response information sent by the first server.

Wherein, the fourth response information carries communication mode execution decision information and/or service identifier association update information; or, the fourth response information carries communication mode execution result information and/or service identifier association update information.

Specifically, the communication mode decision information carries any one of the following information: target communication mode establishment indication information; target communication mode cancellation indication information; communication mode information; communication mode reference information.

In the embodiment of the present disclosure, the target communication mode includes any one of the following modes: only the ProSe direct communication interface PC5 communication mode; PC5 communication and the LTE Uu communication mode of the interface between the long-term evolution base station and the UE; PC5 communication and the NR Uu communication mode of interface between the NR base station and UE; only LTE Uu communication mode; only NR Uu communication mode.

In the embodiment of the present disclosure, the communication mode reference information includes a correlation between the communication mode and at least one of the following information: network monitoring information for the V2X UE; communication status information of the V2X UE; service configuration information.

Wherein, the network monitoring information includes: congestion level information, overload level information, location area information and/or effective time zone information; and/or, the service configuration information includes service configuration identification information, or service configuration index information.

In this embodiment of the present disclosure, the service configuration information includes: communication mode information, third pre-configured information, and service configuration identification information or service configuration index information; wherein, the third pre-configured information includes at least one of the following information: transmission environment scenario information; location area information; density information; speed information; congestion level information; overload level information; service identification information.

What needs to be explained here is that the above-mentioned device provided by the embodiment of the present disclosure can realize all the method steps realized by the above-mentioned method embodiment at the second server side, and can achieve the same technical effect. The same parts and beneficial effects of the method embodiments are not repeated herein.

Figure 22:
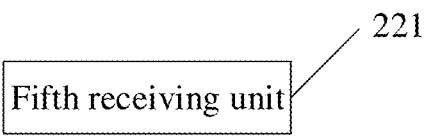
FIG. 22 is a schematic diagram of a third structure of the information processing device according to the embodiment of the present disclosure.

The embodiment of the present disclosure also provides an information processing device, which is applied to a V2X UE, as shown in FIG. 22, including:

a fifth receiving unit 221, configured to receive communication mode decision information sent by a first server;

Wherein, the communication mode decision information is obtained according to network monitoring information and/or current communication status information of the V2X UE, and service configuration information;

There is a correlation between the communication mode decision information and V2X service.

The information processing device provided in the embodiment of the present disclosure receives communication mode decision information sent by the first server; wherein, the communication mode decision information is obtained based on network monitoring information and/or current communication status information of V2X UE, and service configuration information; there is a correlation between the communication mode decision information and V2X service. Therefore, the network side can determine the decision on the communication mode, and then the decision on the communication mode can not only consider the network status, but also consider the impact of service quality of the V2X high layer, the temporal and spatial changes in traffic information on communication mode decision; thereby avoiding the switching between communication modes of V2V communication is determined by UE alone, which may reduce the performance and stability of V2X overall service quality, and cause local service and network congestion, which solves the problem in the related art that the information processing scheme for switching V2X communication modes will reduce the performance and stability of the overall service quality of V2X, and cause local service and network congestion.

Wherein, the communication mode decision information carries at least one of the following information: target communication mode establishment indication information; target communication mode cancellation indication information; communication mode information; communication mode reference information.

Specifically, the target communication mode includes any one of the following modes: only the ProSe direct communication interface PC5 communication mode; PC5 communication and the LTE Uu communication mode of the interface between the long-term evolution base station and the UE; PC5 communication and the NR Uu communication mode of interface between the NR base station and UE; only LTE Uu communication mode; only NR Uu communication mode.

In the embodiment of the present disclosure, the communication mode reference information includes the correlation between the communication mode and at least one of the following information: network monitoring information for the V2X UE; communication status information of the V2X UE; service configuration information.

Wherein, the network monitoring information includes: congestion level information, overload level information, location area information and/or effective time zone information; and/or, the service configuration information includes service configuration identification information, or service configuration index information.

Specifically, the communication status information includes at least one of the following information: vehicle-to-vehicle communication mode information; identity information of the vehicle-to-vehicle communication peer UE; service quality information; an identifier of the V2X UE; speed information of the V2X UE; service identification information.

In the embodiment of the present disclosure, the vehicle-to-vehicle communication mode information includes: the communication mode of the LTE Uu communication interface between the long-term evolution base station and the UE, the communication mode of the PC5 communication interface of the proximity service direct communication interface, the NR Uu communication mode of the interface between the new air interface base station and the UE, and the PC5 communication mode, LTE Uu communication mode or NR Uu communication mode; and/or, the identity information of the vehicle-to-vehicle communication opposite UE includes: the client identification information corresponding to the vehicle network UE of the opposite end, the identification information of the V2X UE of the opposite end and/or the UE identification information of the opposite end V2X user identification information; and/or, the quality of service information includes: end-to-end service delay information and/or data packet loss rate information of V2X UE; and/or, the identification of V2X UE Including: the client identification information corresponding to the vehicle network UE, the vehicle network UE identification information and/or the vehicle network user identification information.

Further, the information processing device further includes: a sixth receiving unit, configured to, before receiving the communication mode decision information sent by the first server, receive second request information sent by the first server; the first feedback unit, configured to feed back second response information to the first server according to the second request information; wherein the second response information carries the communication status information; or, a seventh receiving unit, configured to receive the second subscription information sent by the first server; a second feedback unit, configured to feed back second notification information to the first server information according to the second subscription information; wherein the second notification information carries the communication status information.

In the embodiment of the present disclosure, the information processing device further includes: a first determining unit, configured to, after receiving the communication mode decision information sent by the first server, determine communication mode execution decision information according to the communication mode decision information; wherein, the communication mode execution decision information includes at least one of the following execution decision information: executing to establish a target communication mode; executing to cancel the target communication mode; executing to determine and establish the target communication mode according to the communication mode reference information.

Further, the information processing device further includes: a fourth processing unit, configured to, after determining the communication mode execution decision information according to the communication mode decision information, associate the target communication mode with a current related service identifier for a target communication mode that is determined to establish, to obtain service identifier association update information; and/or, a fifth processing unit, configured to, after determining the execution decision information of the communication mode according to the communication mode decision information, de-associate the target communication mode from the current related service identifier for the target communication mode that is determined to be canceled, to obtain service identifier association update information.

In the embodiment of the present disclosure, the information processing device further includes: a sixth processing unit, configured to, after determining the communication mode execution decision information according to the communication mode decision information, perform decision information according to the communication mode, perform corresponding operations on the communication mode, obtain communication mode execution result information.

Wherein, the receiving the communication mode decision information sent by the first server includes: receiving fourth request information sent by the first server, wherein the fourth request information carries the communication mode decision information; or, receiving network monitoring information notification sent by the first server, wherein the network monitoring information notification carries the communication mode decision information.

Further, the information processing device further includes: a third feedback unit, configured to, after receiving the fourth request information sent by the first server, feed back fourth response information to the first server according to the fourth request information.

Wherein, the fourth response information carries communication mode execution decision information and/or service identifier association update information; or, the fourth response information carries communication mode execution result information and/or service identifier association update information.

Specifically, the service configuration information includes: communication mode information, third pre-configured information, and service configuration identification information or service configuration index information; wherein, the third pre-configured information includes at least one of the following information: transmission environment scenario information; location area information; density information; speed information; congestion level information; overload level information; service identification information.

It should be noted here that the above-mentioned device provided by the embodiment of the present disclosure can realize all the method steps realized by the above-mentioned method embodiment at the V2X UE side, and can achieve the same technical effect. The same parts and beneficial effects of the method embodiments are not repeated herein.

In addition, it should be noted that the division of units in the embodiment of the present disclosure is for illustration, and is only a logical function division, and there may be other division methods in actual implementation. In addition, each functional unit in each embodiment of the present disclosure may be integrated into one processing unit, each unit may exist separately physically, or two or more units may be integrated into one unit. The above-mentioned integrated units can be implemented in the form of hardware or in the form of software functional units.

If the integrated unit is implemented in the form of a software function unit and sold or used as an independent product, it can be stored in a processor-readable storage medium. Based on this understanding, the technical solution of the present disclosure is essentially or part of the contribution to the prior art or all or part of the technical solution can be embodied in the form of a software product, and the computer software product is stored in a storage medium, including several instructions for enabling a computer device (which may be a personal computer, a server, or a network device, etc.) or a processor to execute all or part of the steps of the methods described in the various embodiments of the present disclosure. The aforementioned storage medium include: U disk, mobile hard disk, read-only memory (ROM), random access memory (RAM), magnetic disk or optical disk and other medium that can store program codes.

The embodiment of the present disclosure also provides a processor-readable storage medium, the processor-readable storage medium stores a computer program, and the computer program is used to enable the processor to execute the information processing method on the first server side; or, the computer program is used to make the processor execute the information processing method on the second server side; or, the computer program is used to make the processor execute the information processing method on V2X UE side.

Wherein, the processor-readable storage medium can be any available medium or data storage device that can be accessed by the processor, including but not limited to magnetic storage (such as floppy disk, hard disk, magnetic tape, magneto-optical disk (MO), etc.), optical storage (such as CD, DVD, BD, HVD, etc.), and semiconductor memory (such as ROM, EPROM, EEPROM, non-volatile memory (NAND FLASH), solid-status hard drive (SSD)), etc.

It should be noted here that the above-mentioned processor-readable storage medium provided by the embodiment of the present disclosure can implement all the method steps implemented by the above-mentioned method embodiments on the first server side, the second server side, or the V2X UE side, and the same technical effect can be achieved, and the same parts and beneficial effects in this embodiment as in the method embodiment will not be repeated herein.

Those skilled in the art should understand that the embodiments of the present disclosure may be provided as methods, systems, or computer program products. Accordingly, the present disclosure may take the form of an entirely hardware embodiment, an entirely software embodiment, or an embodiment combining software and hardware aspects. Furthermore, the present disclosure may take the form of a computer program product embodied on one or more computer-usable storage medium (including but not limited to disk storage and optical storage, etc.) having computer-usable program code embodied therein.

The present disclosure is described with reference to flowcharts and/or block diagrams of methods, apparatus (systems), and computer program products according to embodiments of the present disclosure. It should be understood that each procedure and/or block in the flowchart and/or block diagrams, and combinations of procedures and/or blocks in the flowchart and/or block diagrams can be implemented by computer-executable instructions. These computer-executable instructions can be provided to a general purpose computer, special purpose computer, embedded processor, or processor of other programmable data processing equipment to produce a machine, such that instructions executed by the processor of the computer or other programmable data processing equipment produce menas for realizing the functions specified in one or more procedures of a flowchart and/or one or more blocks of a block diagram.

These processor-executable instructions may also be stored in a processor-readable memory capable of directing a computer or other programmable data processing device to operate in a specific manner, such that the instructions stored in the processor-readable memory produce a manufacturing product, the instruction device realizes the function specified in one or more procedures of the flow chart and/or one or more blocks of the block diagram.

These processor-executable instructions can also be loaded onto a computer or other programmable data processing device, causing a series of operational steps to be performed on the computer or other programmable device to produce a computer-implemented processing, the instructions executed on the computer and other programmable device provide steps for implementing the functions specified in one or more flows of the flowchart or one or more block in the block diagram.

The above are optional embodiments of the present disclosure. It should be pointed out that for those skilled in the art, several improvements and modifications can be made without departing from the principles of the present disclosure, and these improvements and modifications should also be regarded as the protection scope of the present disclosure.

What is claimed is:

1. An information processing method, applied to a first server, comprising:

receiving first pre-configured information sent by a second server;

obtaining communication mode decision information according to the first pre-configured information;

sending the communication mode decision information to corresponding Vehicle to Everything (V2X) user equipment (UEs);

wherein, the first pre-configured information includes at least one of the following information:

service configuration information for at least two V2X UEs;

communication mode decision information for the at least two V2X UEs;

wherein, in the case that the first pre-configured information includes service configuration information, the obtaining communication mode decision information according to the first pre-configured information includes:

obtaining network monitoring information for the at least two V2X UEs and/or current communication status information of each V2X UE; and obtaining the communication mode decision information according to the network monitoring information and/or communication status information, and service configuration information.

2. The information processing method according to claim 1, wherein the obtaining the communication mode decision information according to the network monitoring information and/or communication status information, and service configuration information includes:

obtaining real-time information of pre-configured parameters according to the network monitoring information for at least two V2X UEs and/or the current communication status information of each V2X UE;

obtaining the communication mode decision information according to the real-time information and the service configuration information;

wherein the pre-configured parameters include at least one of the following:

a density of V2X UEs within a geographical area where the V2X UEs are located;

a transmission environment scenario where the V2X UEs are located;

a service experience quality of the V2X UEs;

a location area where the V2X UEs are located.

3. The information processing method according to claim 1, wherein the receiving first pre-configured information sent by a second server includes:

sending first request information to the second server;

receiving first response information fed back by the second server according to the first request information, the first response information carrying first pre-configured information; or, sending first subscription information to the second server;

receiving first notification information fed back by the second server according to the first subscription information, the first notification information carrying the first pre-configured information.

4. The information processing method according to claim 1, wherein, when the first pre-configured information includes communication mode decision information, before receiving the first pre-configured information sent by the second server, the method further includes:

Obtaining the network monitoring information for the at least two V2X UEs and/or the current communication status information of each V2X UE;

sending the network monitoring information and/or the communication status information to the second server; or processing the network monitoring information to obtain communication mode decision reference information;

sending the communication mode decision reference information and/or the communication status information to the second server.

5. The information processing method according to claim 1, wherein the obtaining the current communication status information of each V2X UE includes:

sending second request information to the V2X UE;

receiving second response information fed back by the V2X UE according to the second request information; wherein the second response information carries the communication status information; or, sending second subscription information to the V2X UE;

receiving second notification information fed back by the V2X UE according to the second subscription information; wherein the second notification information carries the communication status information.

6. The information processing method according to claim 4, wherein, after obtaining the network monitoring information for the at least two V2X UEs and/or the current communication status information of each V2X UE, the method further includes:

sending third request information to the second server; wherein the third request information carries second pre-configured information and the communication status information;

the receiving the first pre-configured information sent by the second server includes:

receiving third response information fed back by the second server according to the third request information, wherein the third response information carries the first pre-configured information; or, sending third subscription information to the second server; wherein the third subscription information carries the second pre-configured information and the communication status information;

the receiving the first pre-configured information sent by the second server includes:

receiving third notification information fed back by the second server according to the third subscription information, wherein the third notification information carries the first pre-configured information;

wherein the second pre-configured information includes any one of the following:

the network monitoring information for the at least two V2X UEs;

the communication mode decision reference information.

7. The information processing method according to claim 1, wherein the sending the communication mode decision information to corresponding V2X UEs includes:

sending fourth request information to the V2X UE, wherein the fourth request information carries the communication mode decision information; or, sending network monitoring information notification to the V2X UE, wherein the network monitoring information notification carries the communication mode decision information.

8. The information processing method according to claim 7, wherein, after sending the fourth request information to the V2X UE, the method further includes:

receiving fourth response information fed back by the V2X UE according to the fourth request information.

9. The information processing method according to claim 8, wherein, after receiving fourth response information fed back by the V2X UE according to the fourth request information, the method further includes:

sending the fourth response information to the second server;

and/or wherein the fourth response information carries communication mode execution decision information and/or service identifier association update information; or, the fourth response information carries communication mode execution result information and/or the service identifier association update information, wherein the communication mode execution decision information includes at least one of the following:

executing to establish a target communication mode;

executing to cancel the target communication mode;

executing to determine and establish the target communication mode according to communication mode reference information.

10. The information processing method according to claim 1, wherein the communication mode decision information carries any one of the following:

target communication mode establishment indication information;

target communication mode cancellation indication information;

communication mode information;

communication mode reference information.

11. The information processing method according to claim 10, wherein the target communication mode includes any one of the following:

only the ProSe direct communication interface (PC5) communication mode;

PC5 communication mode and the LTE Uu communication mode of the interface between the LTE base station and the UE;

PC5 communication mode and the NR Uu communication mode of the interface between the NR base station and the UE;

only LTE Uu communication mode;

only NR Uu communication mode; or wherein the communication mode reference information includes a correlation between the communication mode and at least one of the following:

the network monitoring information for the at least two V2X UEs;

the communication status information of the at least two V2X UEs;

the service configuration information for the at least two V2X UEs, wherein the network monitoring information includes: congestion level information, overload level information, location area information and/or effective time zone information; and/or, the service configuration information includes service configuration identification information, or service configuration index information.

12. The information processing method according to claim 1, wherein the service configuration information includes: communication mode information, third pre-configured information, and service configuration identification information or service configuration index information;

wherein, the third pre-configured information includes at least one of the following:

transmission environment scenario information;

location area information;

density information;

speed information;

congestion level information;

overload level information;

service identification information.

13. An information processing method, applied to a V2X UE, comprising:

receiving communication mode decision information sent by a first server;

wherein, the communication mode decision information is obtained according to network monitoring information and/or current communication status information of the V2X UE, and service configuration information;

wherein, before receiving the communication mode decision information sent by the first server, the method includes:

receiving second request information sent by the first server;

feeding back second response information to the first server according to the second request information; wherein the second response information carries the communication status information; or, receiving second subscription information sent by the first server;

feeding back second notification information to the first server information according to the second subscription information; wherein the second notification information carries the communication status information.

14. The information processing method according to claim 13, wherein, after receiving the communication mode decision information sent by the first server, the method further includes:

determining communication mode execution decision information according to the communication mode decision information;

wherein, the communication mode execution decision information includes at least one of the following:

executing to establish a target communication mode;

executing to cancel the target communication mode;

executing to determine and establish the target communication mode according to the communication mode reference information.

15. The information processing method according to claim 14, wherein, after determining the communication mode execution decision information according to the communication mode decision information, the method further includes:

associating the target communication mode with a current related service identifier for a target communication mode that is determined to establish, to obtain service identifier association update information; and/or, de-associating the target communication mode from the current related service identifier for a target communication mode that is determined to be canceled, to obtain the service identifier association update information.

16. The information processing method according to claim 14, wherein, after determining the communication mode execution decision information according to the communication mode decision information, the method includes:

performing decision information according to the communication mode, performing corresponding operations on the communication mode, obtaining communication mode execution result information.

17. An V2X UE, including a memory, a transceiver, and a processor:

wherein the memory is used to store computer programs; the transceiver is used to send and receive data under the control of the processor; the processor is used to read the computer programs stored in the memory and perform the steps of the information processing method according to claim 13.

18. A server, being a first server, wherein the server includes a memory, a transceiver, and a processor:

the memory is used to store computer programs; the transceiver is used to send and receive data under the control of the processor; the processor is used to read the computer programs stored in the memory and perform the following operations:

receiving, by the transceiver, first pre-configured information sent by a second server;

obtaining communication mode decision information according to the first pre-configured information;

sending, by the transceiver, the communication mode decision information to corresponding V2X (V2X) UEs;

wherein, the first pre-configured information includes at least one of the following information:

service configuration information for at least two V2X UEs;

communication mode decision information for the at least two V2X UEs;

wherein, in the case that the first pre-configured information includes service configuration information, when obtaining communication mode decision information according to the first pre-configured information, the processor is used to read the computer programs stored in the memory and perform the following operations:

obtaining network monitoring information for the at least two V2X UEs and/or current communication status information of each V2X UE; and obtaining the communication mode decision information according to the network monitoring information and/or communication status information, and service configuration information.

\* \* \* \* \*